(12) United States Patent
Frenne et al.

(10) Patent No.: US 11,750,445 B2
(45) Date of Patent: *Sep. 5, 2023

(54) CONFIGURING MEASUREMENT REFERENCE SIGNALS FOR MIMO

(71) Applicant: TELEFONAKTIEBOLAGET LM ERICSSON (PUBL), Stockholm (SE)

(72) Inventors: Mattias Frenne, Uppsala (SE); Shiwei Gao, Nepean (CA); Robert Mark Harrison, Grapevine, TX (US); Siva Muruganathan, Stittsville (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/404,813

(22) Filed: Aug. 17, 2021

(65) Prior Publication Data

US 2022/0045902 A1    Feb. 10, 2022

Related U.S. Application Data

(63) Continuation of application No. 16/213,556, filed on Dec. 7, 2018, now Pat. No. 11,095,500, which is a
(Continued)

(51) Int. Cl.
*H04L 41/0803* (2022.01)
*H04L 5/00* (2006.01)
*H04B 7/06* (2006.01)

(52) U.S. Cl.
CPC ........ *H04L 41/0803* (2013.01); *H04L 5/0048* (2013.01); *H04B 7/0626* (2013.01)

(58) Field of Classification Search
None
See application file for complete search history.

(56) References Cited

U.S. PATENT DOCUMENTS 9,319,123 B2   4/2016  Park et al.
9,426,703 B2   8/2016  Geirhofer et al.
(Continued)

FOREIGN PATENT DOCUMENTS

WO   2014051374 A1   4/2014
WO   2016133376 A1   8/2016

OTHER PUBLICATIONS

Author Unknown, "Technical Specification Group Radio Access Network; Evolved Universal Terrestrial Radio Access (E-UTRA); Multiplexing and channel coding (Release 12)," Technical Specification 36.212, Version 12.4.0, 3GPP Organizational Partners, Mar. 2015, 94 pages.
(Continued)

*Primary Examiner* — Rebecca E Song

(57) ABSTRACT

Systems and methods relating to 6-port and/or greater than 8-port Channel State Information Reference Signal (CSI-RS) configurations are disclosed. In some embodiments, a method of operation of a radio access node in a cellular communications network comprises configuring a plurality of CSI-RS ports for a wireless device, where the plurality of CSI-RS ports is six CSI-RS ports, ten CSI-RS ports, twelve CSI-RS ports, fourteen CSI-RS ports, or sixteen CSI-RS ports, depending on the embodiment. The method further comprises transmitting CSI-RS on at least a subset of the plurality of CSI-RS ports configured for the wireless device. In this manner, support for, e.g., an increased number of antenna ports and/or support for two-dimensional (2D) antenna arrays is provided.

19 Claims, 27 Drawing Sheets

Related U.S. Application Data continuation of application No. 15/153,025, filed on May 12, 2016, now Pat. No. 10,164,825.

(60) Provisional application No. 62/161,729, filed on May 14, 2015.

(56) References Cited

U.S. PATENT DOCUMENTS

| | | | |
|---|---|---|---|
| 9,686,703 | B2 | 6/2017 | Kim et al. |
| 9,775,061 | B2 | 9/2017 | Wei et al. |
| 2012/0058791 | A1 | 3/2012 | Bhattad et al. |
| 2012/0120905 | A1 | 5/2012 | Ko et al. |
| 2012/0176884 | A1 | 7/2012 | Zhang et al. |
| 2013/0070719 | A1 | 3/2013 | Xu et al. |
| 2013/0114425 | A1 | 5/2013 | Sayana et al. |
| 2013/0182648 | A1 | 7/2013 | Abe et al. |
| 2013/0336152 | A1 | 12/2013 | Zhu et al. |
| 2015/0257132 | A1* | 9/2015 | Park ............. H04W 72/0446 370/329 |
| 2016/0013906 | A1 | 1/2016 | Guo et al. |
| 2016/0094326 | A1* | 3/2016 | Moon ............. H04L 5/14 370/330 |
| 2016/0242060 | A1 | 8/2016 | Kakishima et al. |
| 2016/0301511 | A1 | 10/2016 | Yoon et al. |
| 2016/0337178 | A1 | 11/2016 | Frenne et al. |
| 2017/0134130 | A1 | 5/2017 | Li et al. |
| 2017/0202014 | A1 | 7/2017 | Moon et al. |
| 2017/0207891 | A1 | 7/2017 | Yi et al. |

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.5.0, 3GPP Organizational Partners, Mar. 2015, 136 pages.

Author Unknown, "Technical Specification Group Radio Access Network; Evolved Universal Terrestrial Radio; Access (E-UTRA); Physical layer procedures (Release 12)," Technical Specification 36.213, Version 12.5.0, 3GPP Drganizational Partners, Mar. 2015, 239 pages.

Author Unknown, "Technical Specification Group Radio Access Network; Evolved Universal Terrestrial Radio; I ccess (E-UTRA); Radio Resource Control (RRC); Protocol specification (Release 12)," Technical Specification; 36.331, Version 12.5.0, 3GPP Organizational Partners, Mar. 2015, 445 pages.

Ericsson, "R1-153167: Non-precoded CSI-RS enhancement design considerations," 3rd Generation Partnership Project (3GPP), TSG-RAN WG1#81, May 25-29, 2015, 6 pages, Fukuoka, Japan.

Huawei, "R1-103098: OCC mapping scheme for downlink DMRS," 3rd Generation Partnership Project (3GPP), TSG RAN WG1 meeting #61, May 10-14, 2010, 6 pages, Montreal, Canada.

LG Electronics, "R1-151533: Discussion on non-precoded CSI-RS-based scheme enhancements," 3rd 3eneration Partnership Project (3GPP), TSG RAN WG1 Meeting #80bis, Apr. 20-24, 2015, 6 pages, Belgrade, Serbia.

* cited by examiner

| | CSI REFERENCE SIGNAL CONFIGURATION | NUMBER OF CSI REFERENCE SIGNALS CONFIGURED | | | | | |
|---|---|---|---|---|---|---|---|
| | | 1 OR 2 | | 4 | | 8 | |
| | | (k', l') | $n_s$ mod 2 | (k', l') | $n_s$ mod 2 | (k', l') | $n_s$ mod 2 |
| FRAME STRUCTURE TYPE 1 AND 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| FRAME STRUCTURE TYPE 2 ONLY | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

FIG. 3

| FRAME STRUCTURE TYPE 1 AND 2 | CSI REFERENCE SIGNAL CONFIGURATION | NUMBER OF CSI REFERENCE SIGNALS CONFIGURED | | | | | | | |
|---|---|---|---|---|---|---|---|---|---|
| | | 1 OR 2 | | 4 | | 6/8 | | 10/12/14/16 | |
| | | (k', l') | $n_s$ mod 2 | (k', l') | $n_s$ mod 2 | (k', l') | $n_s$ mod 2 | (k', l') | $n_s$ mod 2 |
| | 0 | (9,5) | 0 | (9,5) | 0 | (9,5) | 0 | (9,5) | 0 |
| | 1 | (11,2) | 1 | (11,2) | 1 | (11,2) | 1 | (11,2) | 1 |
| | 2 | (9,2) | 1 | (9,2) | 1 | (9,2) | 1 | | |
| | 3 | (7,2) | 1 | (7,2) | 1 | (7,2) | 1 | | |
| | 4 | (9,5) | 1 | (9,5) | 1 | (9,5) | 1 | | |

FIG. 15

| Frame Structure Type 1 and 2 | CSI Reference Signal Config. | 1 or 2 | | 4 | | 6 | | 8 | | 10 | | 12 | | 14 | | 16 | |
|---|---|---|---|---|---|---|---|---|---|---|---|---|---|---|---|---|---|
| | | (k′, l′) | n$_s$ mod 2 | (k′, l′) | n$_s$ mod 2 | (k′, l′) | n$_s$ mod 2 | (k′, l′) | n$_s$ mod 2 | (k′, l′) | n$_s$ mod 2 | (k′, l′) | n$_s$ mod 2 | (k′, l′) | n$_s$ mod 2 | (k′, l′) | n$_s$ mod 2 |
| | 0 | (9,5) | 0 | (9,5) | 0 | (9,5) | 0 | (9,5) | 0 | | | | | (9,5) | 0 | (9,5) | 0 |
| | 1 | (11,2) | 1 | (11,2) | 1 | (11,2) | 1 | (11,2) | 1 | (11,2) | 1 | (11,2) | 1 | (11,2) | 1 | (11,2) | 1 |
| | 2 | (9,2) | 1 | (9,2) | 1 | (9,2) | 1 | (9,2) | 1 | (9,2) | 1 | (9,2) | 1 | | | | |
| | 3 | (7,2) | 1 | (7,2) | 1 | (7,2) | 1 | (7,2) | 1 | | | | | | | | |
| | 4 | (9,5) | 1 | (9,5) | 1 | (9,5) | 1 | (9,5) | 1 | | | | | | | | |

NUMBER OF CSI REFERENCE SIGNALS CONFIGURED

US 11,750,445 B2

CONFIGURING MEASUREMENT REFERENCE SIGNALS FOR MIMO

RELATED APPLICATIONS

This application is a continuation of U.S. patent application Ser. No. 16/213,556, filed Dec. 7, 2018, granted as U.S. Pat. No. 11,095,500 on Aug. 17, 2021, which is a continuation of U.S. patent application Ser. No. 15/153,025, filed May 12, 2016, granted as U.S. Pat. No. 10,164,825 on Dec. 25, 2018, which claims the benefit of U.S. Provisional Patent Application No. 62/161,729, filed May 14, 2015, the disclosures of which are hereby incorporated herein by reference in their entireties.

TECHNICAL FIELD

This disclosure pertains to configuring measurement reference signals, and in particular, configuring measurement reference signals for a Multiple Input Multiple Output (MIMO) wireless communication system.

BACKGROUND

Codebook-Based Precoding

Multi-antenna techniques can significantly increase the data rates and reliability of a wireless communication system. The performance is particularly improved if both the transmitter and the receiver are equipped with multiple antennas, which results in a Multiple Input Multiple Output (MIMO) communication channel. Such systems and/or related techniques are commonly referred to as MIMO.

The Third Generation Partnership Project (3GPP) Long Term Evolution (LTE) standard is currently evolving with enhanced MIMO support. A core component in LTE is the support of MIMO antenna deployments and MIMO related techniques. Currently, LTE-Advanced supports an 8-layer spatial multiplexing mode for eight Transmit (TX) antennas with channel dependent precoding. The spatial multiplexing mode is aimed for high data rates in favorable channel conditions. An illustration of the spatial multiplexing operation is provided in FIG. 1.

In particular, FIG. 1 illustrates the transmission structure of precoded spatial multiplexing mode in LTE. As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and is typically indicated by means of a Precoder Matrix Indicator (PMI), which specifies a unique precoder matrix in the codebook for a given number of symbol streams. The r symbols in s each correspond to a layer, and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties.

LTE uses Orthogonal Frequency Division Multiplexing (OFDM) in the downlink (and Discrete Fourier Transform (DFT) precoded OFDM in the uplink) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over a frequency, or frequency selective.

The precoder matrix is often chosen to match the characteristics of the $N_R \times N_T$ MIMO channel matrix H, resulting in so-called channel dependent precoding. This is also commonly referred to as closed-loop precoding and essentially strives for focusing the transmit energy into a subspace which is strong in the sense of conveying much of the transmitted energy to the wireless device (e.g., User Equipment device (UE)). In addition, the precoder matrix may also be selected to strive for orthogonalizing the channel, meaning that after proper linear equalization at the wireless device, the inter-layer interference is reduced.

The transmission rank, and thus the number of spatially multiplexed layers, is reflected in the number of columns of the precoder. For efficient performance, it is important that a transmission rank that matches the channel properties is selected.

Channel State Information Reference Symbols/Signals (CSI-RSs)

In LTE Release-10, a new reference symbol sequence was introduced with the intent to estimate Channel State Information (CSI), the CSI-RS for up to 8 antennas. The CSI-RS provides several advantages over basing the CSI feedback on the Common Reference Symbols/Signals (CRSs) which were used, for that purpose, in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a wireless device specific manner).

By measuring on a CSI-RS, a wireless device can estimate the effective channel the CSI-RS is traversing including the radio propagation channel and antenna gains. In more mathematical rigor, this implies that if a known CSI-RS signal X is transmitted, a wireless device can estimate the coupling between the transmitted signal and the received signal (i.e., the effective channel). Hence, if no virtualization is performed in the transmission, the received signal y can be expressed as $$y = Hx + e$$

and the wireless device can estimate the effective channel H.

Up to eight CSI-RS ports can be configured; that is, the wireless device can estimate the channel from up to eight transmit antennas. The CSI-RSs are modulated using a sequence that depends on a virtual cell Identifier (ID), which can be different from the cell ID being used in the cell. The CSI-RS utilizes an Orthogonal Cover Code (OCC) of length two to overlay two antenna ports on two consecutive Resource Elements (REs). As seen in FIGS. 2A-2C, many different CSI-RS patterns are available. For the case of two CSI-RS antenna ports (FIG. 2A), there are 20 different patterns within a subframe. The corresponding number of patterns is ten and five for four and eight CSI-RS antenna ports, respectively. For Time Division Duplexing (TDD), some additional CSI-RS patterns are available.

In subframes configured for CSI reference signal transmission, a CSI-RS reference signal sequence $r_{l,n_s}(m)$ is mapped to complex-valued modulation symbols $a_{k,l}^{(p)}$ used as reference symbols on antenna port p as follows:

$$a_{k,l}^{(p)} = w_{l''} \cdot r_{l,n_s}(m')$$

where $n_s \in \{0,1\}$ is the slot number within a radio frame and $l \in \{0, 1, 2, \ldots, 6\}$ is the OFDM symbol number within the slot, $m=0, 1, \ldots, N_{RB}^{max,DL}-1$ is the PRB index and $N_{RB}^{max,DL}$ is maximum number of PRBs in downlink supported by LTE, $k \in \{0, 1, 2, \ldots, 12N_{RB}^{DL}-1\}$ is the subcarrier index and $N_{RB}^{DL}$ is the number of PRBs in a downlink system bandwidth, $w_{l''}$ and m' are further described below.

The CSI reference signal configurations are given by Table 1, taken from Technical Specification (TS) 36.211 V12.5.0, which is illustrated in FIG. 3. For example, the CSI-RS configuration 4 for four antennas ports use (k',l')= (9,5) in slot 1 (the second slot of the subframe), and using the formulas below, ports 15, 16, use OCC over the resource elements (k,l)=(9,5), (9,6) and ports 17, 18 use OCC over REs (3,5), (3,6) respectively (assuming Physical Resource Block (PRB) index m=0). Note that, with respect to the OFDM symbol index l, while FIGS. 2A-2C (and other similar figures) show OFDM symbol numbers 0 to 13, in Table 1 illustrated in FIG. 3 and the equations below, the OFDM symbols are indexed as OFDM symbols 0 to 6 of slot 0 (where $n_s$ mod (2)=0) and OFDM symbols 0 to 6 of slot 1 (where $n_s$ mod (2)=1). The orthogonal cover code (OCC) is introduced below by the factor $w_{l''}$ $$k = k' + 12m + \begin{cases} -0 \text{ for } p \in \{15, 16\}, \text{ normal cyclic prefix} \\ -6 \text{ for } p \in \{17, 18\}, \text{ normal cyclic prefix} \\ -1 \text{ for } p \in \{19, 20\}, \text{ normal cyclic prefix} \\ -7 \text{ for } p \in \{21, 22\}, \text{ normal cyclic prefix} \\ -0 \text{ for } p \in \{15, 16\}, \text{ extended cyclic prefix} \\ -3 \text{ for } p \in \{17, 18\}, \text{ extended cyclic prefix} \\ -6 \text{ for } p \in \{19, 20\}, \text{ extended cyclic prefix} \\ -9 \text{ for } p \in \{21, 22\}, \text{ extended cyclic prefix} \end{cases}$$

$$l = l' + \begin{cases} l'' \quad CSI \text{ reference signal configurations 0-19, normal cyclic prefix} \\ 2l'' \quad CSI \text{ reference signal configurations 20-31, normal cyclic prefix} \\ l'' \quad CSI \text{ reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Two-Dimensional (2D) Antenna Arrays

Recent developments in 3GPP have led to the discussion of 2D antenna arrays where each antenna element has an independent phase and amplitude control, thereby enabling beamforming in both in the vertical and the horizontal dimension. Such antenna arrays may be (partly) described by the number of antenna columns corresponding to the horizontal dimension $M_h$, the number of antenna rows corresponding to the vertical dimension $M_v$, and the number of dimensions corresponding to different polarizations $M_p$. The total number of antennas is thus $M=M_h M_v M_p$. An example of an antenna where $M_h=8$ and $M_v=4$, assuming that one antenna element corresponds to one antenna port, is illustrated in FIG. 4. The antenna furthermore consists of cross-polarized antenna elements meaning that $M_p=2$. Such an antenna is denoted as an 8×4 antenna array with cross-polarized antenna elements.

It should be pointed out that the concept of an antenna element is non-limiting in the sense that it can refer to any virtualization (e.g., linear mapping) of a transmitted signal to the physical antenna elements. For example, groups of physical antenna elements could be fed the same signal, and hence they share the same virtualized antenna port when observed by the receiver. Hence, the receiver cannot distinguish and measure the channel from each individual antenna element within the group of elements that are virtualized together. Hence, the terms "antenna element," "antenna port," or simply "port" should be considered interchangeable in this document.

SUMMARY

Systems and methods relating to 6-port and/or greater than 8-port Channel State Information Reference Signal (CSI-RS) configurations are disclosed. In some embodiments, a method of operation of a radio access node in a cellular communications network comprises configuring a plurality of CSI-RS ports for a wireless device, where the plurality of CSI-RS ports is six CSI-RS ports, ten CSI-RS ports, twelve CSI-RS ports, fourteen CSI-RS ports, or sixteen CSI-RS ports, depending on the embodiment. The method further comprises transmitting CSI-RS on at least a subset of the plurality of CSI-RS ports configured for the wireless device. In this manner, support for, e.g., an increased number of antenna ports and/or support for two-dimensional (2D) antenna arrays is provided.

In some embodiments, a group of four CSI-RS ports of the plurality of CSI-RS ports configured for the wireless device are mapped to a group of four CSI-RS Resource Elements (REs), and transmitting the CSI-RS comprises multiplexing CSI-RS for the group of four CSI-RS ports onto the group of four CSI-RS REs using respective length-4 Orthogonal Cover Codes (OCCs). In some embodiments, the group of four CSI-RS REs are in four Orthogonal Frequency Division Multiplexing (OFDM) symbols on a single subcarrier. In other embodiments, the group of four CSI-RS REs are on four subcarriers in a single OFDM symbol.

In some other embodiments, the group of four CSI-RS REs are in two OFDM symbols on two subcarriers. Further, in some embodiments, multiplexing CSI-RS for the group of four CSI-RS ports onto the group of four CSI-RS REs using respective length-4 OCCs comprises, for each of the two subcarriers, combining the two OFDM symbols with a length-2 OCC, the length-2 OCC being an OCC used across OFDM symbols for CSI-RS configurations of 2, 4, or 8 ports. In some embodiments, the OFDM symbols are adjacent in time and the two subcarriers are adjacent in frequency.

In some embodiments, the plurality of CSI-RS ports comprise sixteen CSI-RS ports that are equivalent to a combination of two predefined 8-port CSI-RS configurations.

In some embodiments, configuring the plurality of CSI-RS ports for the wireless device comprises configuring a merger of two or more predefined CSI-RS configurations for the wireless device. Further, in some embodiments, there is a plurality of predefined CSI-RS configurations comprising multiple predefined 8-port CSI-RS configurations, multiple predefined 4-port CSI-RS configurations, and multiple predefined 2-port CSI-RS configurations. The two or more predefined CSI-RS configurations for the merger are limited to combinations of two or more of the plurality of predefined CSI-RS configurations that result in at least four CSI-RS REs per Physical Resource Block (PRB) per OFDM symbol that contains CSI-RS.

In some embodiments, the two or more predefined CSI-RS configurations comprise two predefined 8-port CSI-RS configurations such that the plurality of CSI-RS ports configured for the wireless device is sixteen CSI-RS ports. In some other embodiments, the two or more predefined CSI-RS configurations comprise a predefined 8-port CSI-RS configuration, a predefined 4-port CSI-RS configuration, and a predefined 2-port CSI-RS configuration such that the plurality of CSI-RS ports configured for the wireless device is fourteen CSI-RS ports. In some other embodiments, the two or more predefined CSI-RS configurations comprise a predefined 8-port CSI-RS configuration and a predefined 4-port CSI-RS configuration such that the plurality of CSI-RS ports configured for the wireless device is fourteen CSI-RS ports. In some other embodiments, the two or more predefined CSI-RS configurations comprise a predefined 8-port CSI-RS configuration and a predefined 2-port CSI-RS configuration such that the plurality of CSI-RS ports configured for the wireless device is fourteen CSI-RS ports. In some other embodiments, the two or more predefined CSI-RS configurations comprise a predefined 4-port CSI-RS configuration and a predefined 2-port CSI-RS configuration such that the plurality of CSI-RS ports configured for the wireless device is fourteen CSI-RS ports.

In some embodiments, the plurality of CSI-RS ports configured for the wireless device comprises more than eight CSI-RS ports, and configuring the plurality of CSI-RS ports for the wireless device comprises signaling one of two or more predefined 16-port CSI-RS configurations to the wireless device.

In some embodiments, configuring the plurality of CSI-RS ports for the wireless device comprises signaling one of two or more predefined 16-port CSI-RS configurations to the wireless device and signaling an indication of a number P of active CSI-RS ports to the wireless device, where $8<P\leq16$. Transmitting CSI-RS on the at least a subset of the plurality of CSI-RS ports configured for the wireless device comprises transmitting CSI-RS only on the number P of active CSI-RS ports of the plurality of CSI-RS ports reserved for CSI-RS by the one of the two or more predefined 16-port CSI-RS configurations. Further, in some embodiments, a group of four CSI-RS ports of the number P of active CSI-RS ports of the plurality of CSI-RS ports configured for the wireless device are mapped to a group of four CSI-RS REs, and transmitting the CSI-RS comprises multiplexing CSI-RS for the group of four CSI-RS ports onto the group of four CSI-RS REs using respective length-4 OCCs.

In some embodiments, configuring the plurality of CSI-RS ports for the wireless device comprises signaling one CSI-RS configuration of a plurality of CSI-RS configurations to the wireless device. The plurality of CSI-RS configurations comprising one or more predefined 16-port CSI-RS configurations, one or more 14-port CSI-RS configurations, one or more 12-port CSI-RS configurations, one or more 10-port CSI-RS configurations, and one or more 6-port CSI-RS configurations.

In some embodiments, configuring the plurality of CSI-RS ports for the wireless device comprises signaling a bit sequence to the wireless device that is an indication of a merger of two or more predefined CSI-RS configurations for the wireless device. The bit sequence comprises a first set of bits that indicate which, if any, of multiple predefined 8-port configurations are to be included in the merger, a second set of bits that indicate which, if any, of multiple predefined 4-port configurations are to be included in the merger, and a third set of bits that indicate which, if any, of multiple predefined 2-port configurations are to be included in the merger.

In some embodiments, configuring the plurality of CSI-RS ports for the wireless device comprises signaling an encoded bit sequence to the wireless device that is an indication of a merger of two or more predefined CSI-RS configurations for the wireless device. In some embodiments, a codespace for the encoded bit sequence comprises a subset of all possible combinations of a plurality of predefined CSI-RS configurations. The subset is less than all of the possible combinations.

In some embodiments, configuring the plurality of CSI-RS ports for the wireless device comprises signaling a bit map to the wireless device that is an indication of which of a plurality of predefined CSI-RS resources contain CSI-RS. In some embodiments, the bit map also indicates the number of CSI-RS ports configured for the wireless device.

Embodiments of a radio access node for a cellular communications network are also disclosed. In some embodiments, the radio access node comprises a transceiver, a processor, and memory storing software instructions executable by the processor whereby the radio access node is operable to configure a plurality of CSI-RS ports for a wireless device and transmit, via the transceiver, CSI-RS on at least a subset of the plurality of CSI-RS ports configured for the wireless device. The plurality of CSI-RS ports is six CSI-RS ports, ten CSI-RS ports, twelve CSI-RS ports, fourteen CSI-RS ports, or sixteen CSI-RS ports, depending on the embodiment.

In some embodiments, a group of four CSI-RS ports of the plurality of CSI-RS ports configured for the wireless device are mapped to a group of four CSI-RS REs. When transmitting the CSI-RS, the CSI-RS for the group of four CSI-RS ports are multiplexed onto the group of four CSI-RS REs using respective length-4 OCCs.

In some embodiments, the plurality of CSI-RS ports comprise sixteen CSI-RS ports that are equivalent to a combination of two predefined 8-port CSI-RS configurations.

In some embodiments, in order to configure the plurality of CSI-RS ports for the wireless device, the radio access node is further operable to configure a merger of two or more predefined CSI-RS configurations for the wireless device. In some embodiments, there is a plurality of predefined CSI-RS configurations comprising multiple predefined 8-port CSI-RS configurations, multiple predefined 4-port CSI-RS configurations, and multiple predefined 2-port CSI-RS configurations, and the two or more predefined CSI-RS configurations for the merger are limited to combinations of two or more of the plurality of predefined CSI-RS configurations that result in at least four CSI-RS REs per PRB per OFDM symbol that contains CSI-RS.

In some embodiments, a radio access node for a cellular communications network is adapted to configure a plurality of CSI-RS ports for a wireless device and transmit CSI-RS on at least a subset of the plurality of CSI-RS ports configured for the wireless device. The plurality of CSI-RS ports is six CSI-RS ports, ten CSI-RS ports, twelve CSI-RS ports, fourteen CSI-RS ports, or sixteen CSI-RS ports, depending on the embodiment.

In some embodiments, the radio access node is further adapted to perform the method of operation of a radio access node according to any of the embodiments described herein.

In some embodiments, a radio access node for a cellular communications network comprises a signaling module operable to configure a plurality of CSI-RS ports for a wireless device and a transmission module operable to transmit CSI-RS on at least a subset of the plurality of CSI-RS ports configured for the wireless device. The plurality of CSI-RS ports is six CSI-RS ports, ten CSI-RS ports, twelve CSI-RS ports, fourteen CSI-RS ports, or sixteen CSI-RS ports, depending on the embodiment.

Embodiments of a non-transitory computer readable medium are also disclosed. In some embodiments, a non-transitory computer readable medium stores software instructions that when executed by a processor of a radio access node for a cellular communications network cause the radio access node to configure a plurality of CSI-RS ports for a wireless device and transmit CSI-RS on at least a subset of the plurality of CSI-RS ports configured for the wireless device. The plurality of CSI-RS ports is six CSI-RS ports, ten CSI-RS ports, twelve CSI-RS ports, fourteen CSI-RS ports, or sixteen CSI-RS ports, depending on the embodiment.

Embodiments of a computer program are also disclosed herein. In some embodiments, a computer program comprising instructions which, when executed on at least one processor, cause the at least one processor to carry out the method of operation of a radio access node according to any of the embodiments disclosed herein. Embodiments of a carrier are also disclosed. In some embodiments, a carrier contains the aforementioned computer program, wherein the carrier is one of an electronic signal, an optical signal, a radio signal, or a computer readable storage medium.

Embodiments of a method of operation of a wireless device are also disclosed. In some embodiments, a method of operation of a wireless device comprises receiving configuration of a plurality of CSI-RS ports from a radio access node. The plurality of CSI-RS ports is six CSI-RS ports, ten CSI-RS ports, twelve CSI-RS ports, fourteen CSI-RS ports, or sixteen CSI-RS ports, depending on the embodiment. The method further comprises performing measurements on at least a subset of the plurality of CSI-RS ports configured for the wireless device and transmitting a CSI report to the radio access node based on the measurements.

In some embodiments, a group of four CSI-RS ports of the plurality of CSI-RS ports configured for the wireless device are mapped to a group of four CSI-RS REs, and CSI-RS for the group of four CSI-RS ports are multiplexed onto the group of four CSI-RS REs using respective length-4 OCCs. Further, in some embodiments, the group of four CSI-RS REs are in four OFDM symbols on a single subcarrier. In other embodiments, the group of four CSI-RS REs are on four subcarriers in a single OFDM symbol. In some other embodiments, the group of four CSI-RS REs are in two OFDM symbols on two subcarriers.

In some other embodiments, the plurality of CSI-RS ports comprise sixteen CSI-RS ports that are equivalent to a combination of two predefined 8-port CSI-RS configurations.

In some other embodiments, receiving configuration of the plurality of CSI-RS ports comprises receiving a configuration of a merger of two or more predefined CSI-RS configurations. Further, in some embodiments, there is a plurality of predefined CSI-RS configurations comprising multiple predefined 8-port CSI-RS configurations, multiple predefined 4-port CSI-RS configurations, and multiple predefined 2-port CSI-RS configurations, and the two or more predefined CSI-RS configurations for the merger are limited to combinations of two or more of the plurality of predefined CSI-RS configurations that result in at least four CSI-RS REs per PRB per OFDM symbol that contains CSI-RS.

In some embodiments, the two or more predefined CSI-RS configurations comprise two predefined 8-port CSI-RS configurations such that the plurality of CSI-RS ports configured for the wireless device is sixteen CSI-RS ports. In some other embodiments, the two or more predefined CSI-RS configurations comprise a predefined 8-port CSI-RS configuration, a predefined 4-port CSI-RS configuration, and a predefined 2-port CSI-RS configuration such that the plurality of CSI-RS ports configured for the wireless device is fourteen CSI-RS ports. In some other embodiments, the two or more predefined CSI-RS configurations comprise a predefined 8-port CSI-RS configuration and a predefined 4-port CSI-RS configuration such that the plurality of CSI-RS ports configured for the wireless device is fourteen CSI-RS ports. In some other embodiments, the two or more predefined CSI-RS configurations comprise a predefined 8-port CSI-RS configuration and a predefined 2-port CSI-RS configuration such that the plurality of CSI-RS ports configured for the wireless device is fourteen CSI-RS ports. In some other embodiments, the two or more predefined CSI-RS configurations comprise a predefined 4-port CSI-RS configuration and a predefined 2-port CSI-RS configuration such that the plurality of CSI-RS ports configured for the wireless device is fourteen CSI-RS ports.

In some embodiments, the plurality of CSI-RS ports configured for the wireless device comprises more than eight CSI-RS ports, and receiving configuration of the plurality of CSI-RS ports comprises receiving a configuration of one of two or more predefined 16-port CSI-RS configurations.

In some embodiments, receiving configuration of the plurality of CSI-RS ports comprises receiving a configuration of one of two or more predefined 16-port CSI-RS configurations and receiving an indication of a number P of active CSI-RS ports to the wireless device, where $8<P\leq16$. Performing the measurements on the CSI-RS on the at least a subset of the plurality of CSI-RS ports configured for the wireless device comprises performing the measurements on the CSI-RS only on the number P of active CSI-RS ports of the plurality of CSI-RS ports reserved for CSI-RS by the one of the two or more predefined 16-port CSI-RS configurations. Further, in some embodiments, a group of four CSI-RS ports of the number P of active CSI-RS ports of the plurality of CSI-RS ports configured for the wireless device are mapped to a group of four CSI-RS REs, and the CSI-RS for the group of four CSI-RS ports are multiplexed onto the group of four CSI-RS REs using respective length-4 OCCs.

In some embodiments, receiving configuration of the plurality of CSI-RS ports comprises receiving a configuration of one CSI-RS configuration of a plurality of CSI-RS configurations, the plurality of CSI-RS configurations comprising one or more predefined 16-port CSI-RS configurations, one or more 14-port CSI-RS configurations, one or more 12-port CSI-RS configurations, one or more 10-port CSI-RS configurations, and one or more 6-port CSI-RS configurations.

In some embodiments, receiving configuration of the plurality of CSI-RS ports comprises receiving a bit sequence that is an indication of a merger of two or more predefined CSI-RS configurations for the wireless device. The bit sequence comprises a first set of bits that indicate which, if any, of multiple predefined 8-port configurations are to be included in the merger, a second set of bits that indicate which, if any, of multiple predefined 4-port configurations are to be included in the merger, and a third set of bits that indicate which, if any, of multiple predefined 2-port configurations are to be included in the merger.

In some embodiments, receiving configuration of the plurality of CSI-RS ports comprises receiving an encoded bit sequence that is an indication of a merger of two or more predefined CSI-RS configurations for the wireless device. Further, in some embodiments, a codespace for the encoded bit sequence comprises a subset of all possible combinations of the predefined CSI-RS configurations, the subset being less than all of the possible combinations.

In some embodiments, receiving configuration of the plurality of CSI-RS ports comprises receiving a bit map that is an indication of which of a plurality of predefined CSI-RS resources contain CSI-RS. Further, in some embodiments, the bit map also indicates the number of CSI-RS ports configured for the wireless device.

Embodiments of a wireless device for a cellular communications network are also disclosed. In some embodiments, the wireless device comprises a transceiver, a processor, and memory storing software instructions executable by the processor whereby the wireless device is operable to receive, via the transceiver, configuration of a plurality of CSI-RS ports from a radio access node, perform measurements on at least a subset of the plurality of CSI-RS ports configured for the wireless device, and transmit, via the transceiver, a CSI report to the radio access node based on the measurements. The plurality of CSI-RS ports is six CSI-RS ports, ten CSI-RS ports, twelve CSI-RS ports, fourteen CSI-RS ports, or sixteen CSI-RS ports, depending on the embodiment.

In some embodiments, a group of four CSI-RS ports of the plurality of CSI-RS ports configured for the wireless device are mapped to a group of four CSI-RS REs, and CSI-RS for the group of four CSI-RS ports are multiplexed onto the group of four CSI-RS REs using respective length-4 OCCs. In some embodiments, the plurality of CSI-RS ports comprise sixteen CSI-RS ports that are equivalent to a combination of two predefined 8-port CSI-RS configurations.

In some embodiments, the configuration is a configuration of a merger of two or more predefined CSI-RS configurations. Further, in some embodiments, there is a plurality of predefined CSI-RS configurations comprising multiple predefined 8-port CSI-RS configurations, multiple predefined 4-port CSI-RS configurations, and multiple predefined 2-port CSI-RS configurations, and the two or more predefined CSI-RS configurations for the merger are limited to combinations of two or more of the plurality of predefined CSI-RS configurations that result in at least four CSI-RS REs per PRB per OFDM symbol that contains CSI-RS.

In some embodiments, a wireless device for a cellular communications network is adapted to receive configuration of a plurality of CSI-RS ports from a radio access node, perform measurements on at least a subset of the plurality of CSI-RS ports configured for the wireless device, and transmit a Channel State Information (CSI) report to the radio access node based on the measurements. The plurality of CSI-RS ports is six CSI-RS ports, ten CSI-RS ports, twelve CSI-RS ports, fourteen CSI-RS ports, or sixteen CSI-RS ports, depending on the embodiment. In some embodiments, the wireless device is further adapted to perform the method of operation of a wireless device according to any of the embodiments described herein.

In some embodiments, a wireless device for a cellular communications network comprises a reception module operable to receive configuration of a plurality of CSI-RS ports from a radio access node, a measurement module operable to perform measurements on at least a subset of the plurality of CSI-RS ports configured for the wireless device, and a transmission module operable to transmit a CSI report to the radio access node based on the measurements. The plurality of CSI-RS ports is six CSI-RS ports, ten CSI-RS ports, twelve CSI-RS ports, fourteen CSI-RS ports, or sixteen CSI-RS ports, depending on the embodiment.

Embodiments of a non-transitory computer readable medium are also disclosed. In some embodiments, a non-transitory computer readable medium stores software instructions that when executed by a processor of a wireless device for a cellular communications network cause the wireless device to receive configuration of a plurality of CSI-RS ports from a radio access node, perform measurements on at least a subset of the plurality of CSI-RS ports configured for the wireless device, and transmit a CSI report to the radio access node based on the measurements. The plurality of CSI-RS ports is six CSI-RS ports, ten CSI-RS ports, twelve CSI-RS ports, fourteen CSI-RS ports, or sixteen CSI-RS ports, depending on the embodiment.

Embodiments of a computer program are also disclosed. In some embodiments, a computer program comprises instructions which, when executed on at least one processor, cause the at least one processor to carry out the method of operation of a wireless device according to any of the embodiments described herein. In some embodiments, a carrier containing the aforementioned computer program is provided, wherein the carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates a table taken from 3GPP Technical Specification (TS) 36.211 V12.5.0, which defines many different CSI-RS patterns, or configurations, available in 3GPP LTE Release 12;

FIG. 15 illustrates an example in which the existing CSI-RS configuration table is extended by including a new column for each of six, ten, twelve, fourteen, and sixteen CSI-RS ports according to some embodiments of the present disclosure;

DETAILED DESCRIPTION

Figure 1:
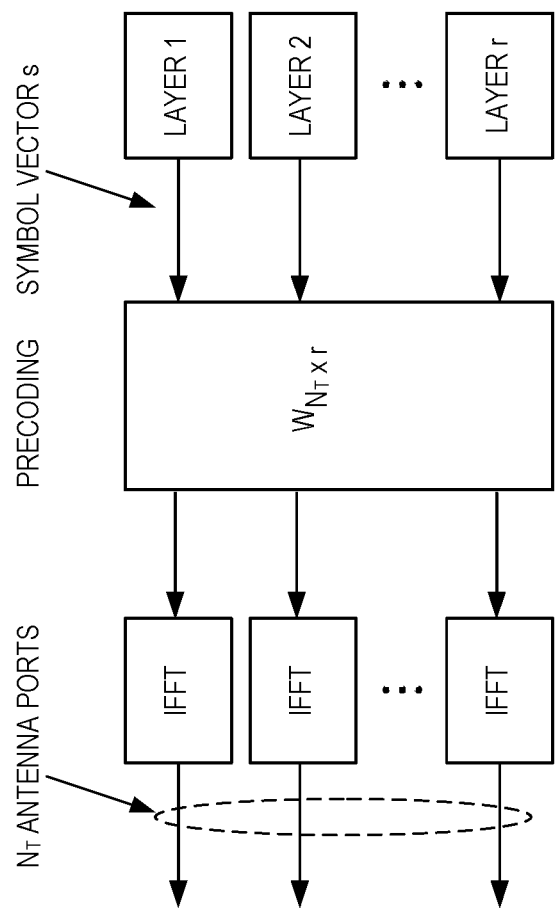
FIG. 1 is an illustration of a spatial multiplexing operation.
Figure 2A:
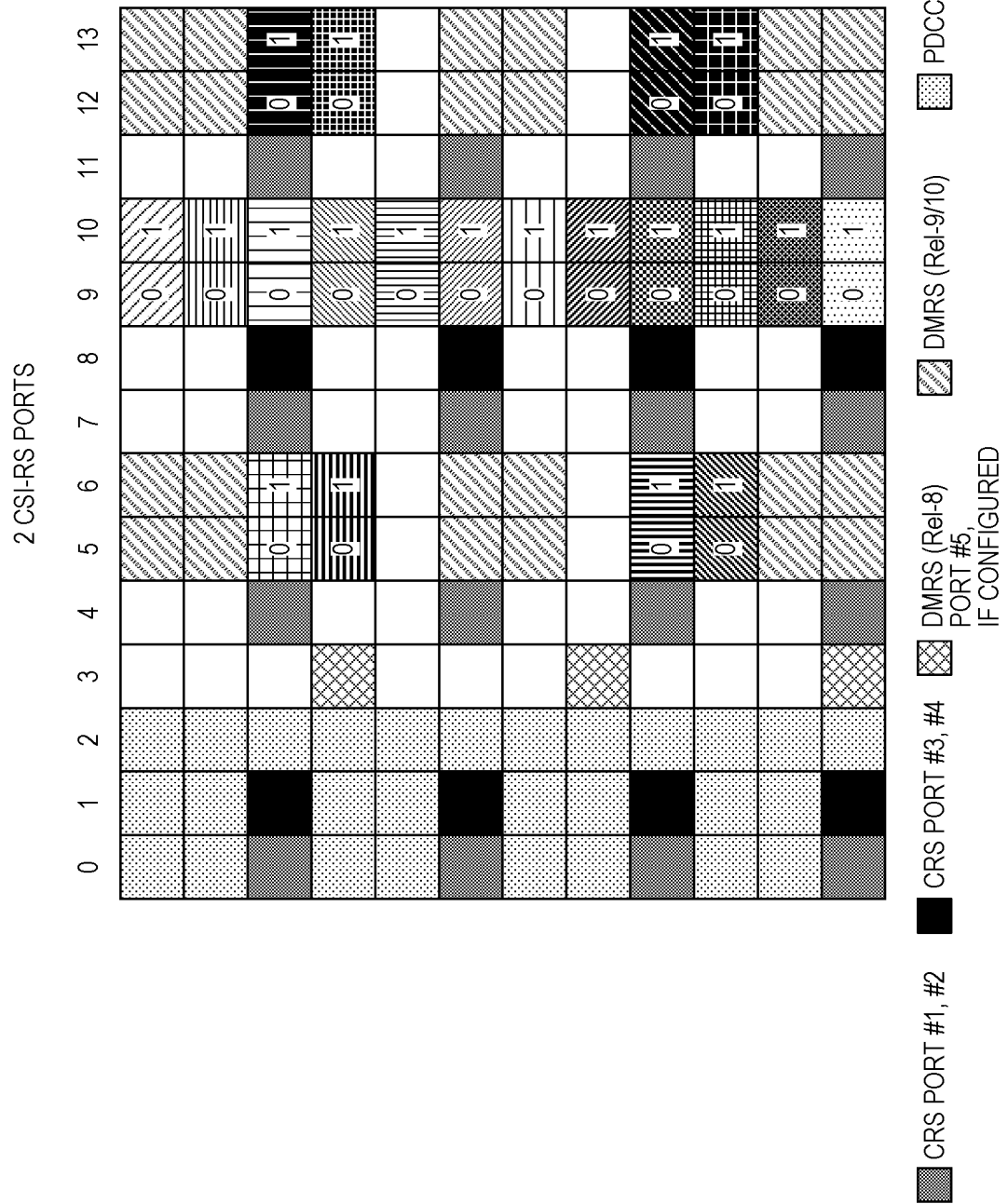
FIGS. 2A through 2C illustrate many different Channel State Information Reference Signal (CSI-RS) patterns that are available in Third Generation Partnership (3GPP) Long Term Evolution (LTE) Release 12.
Figure 2B:
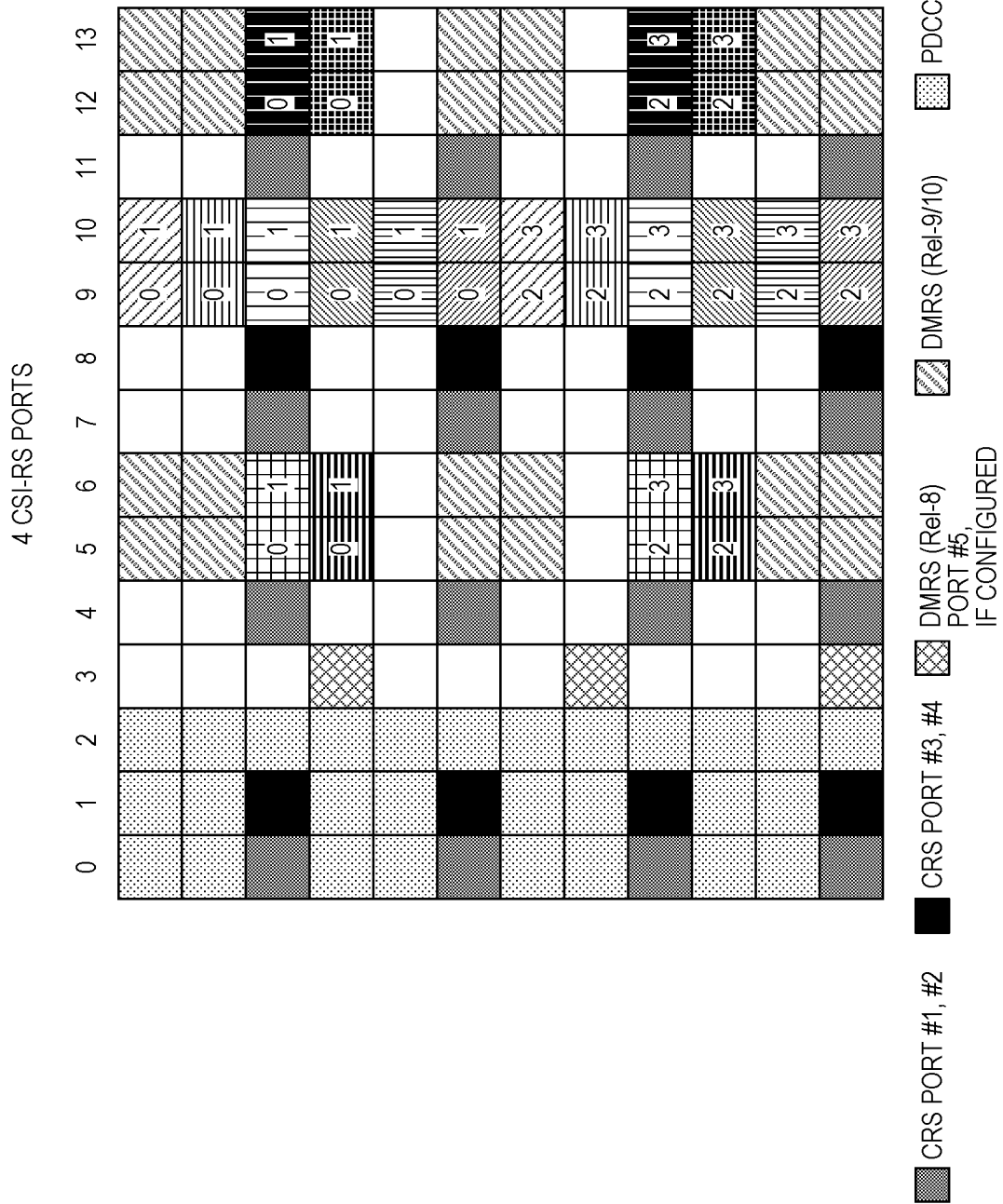
Figure 2C:
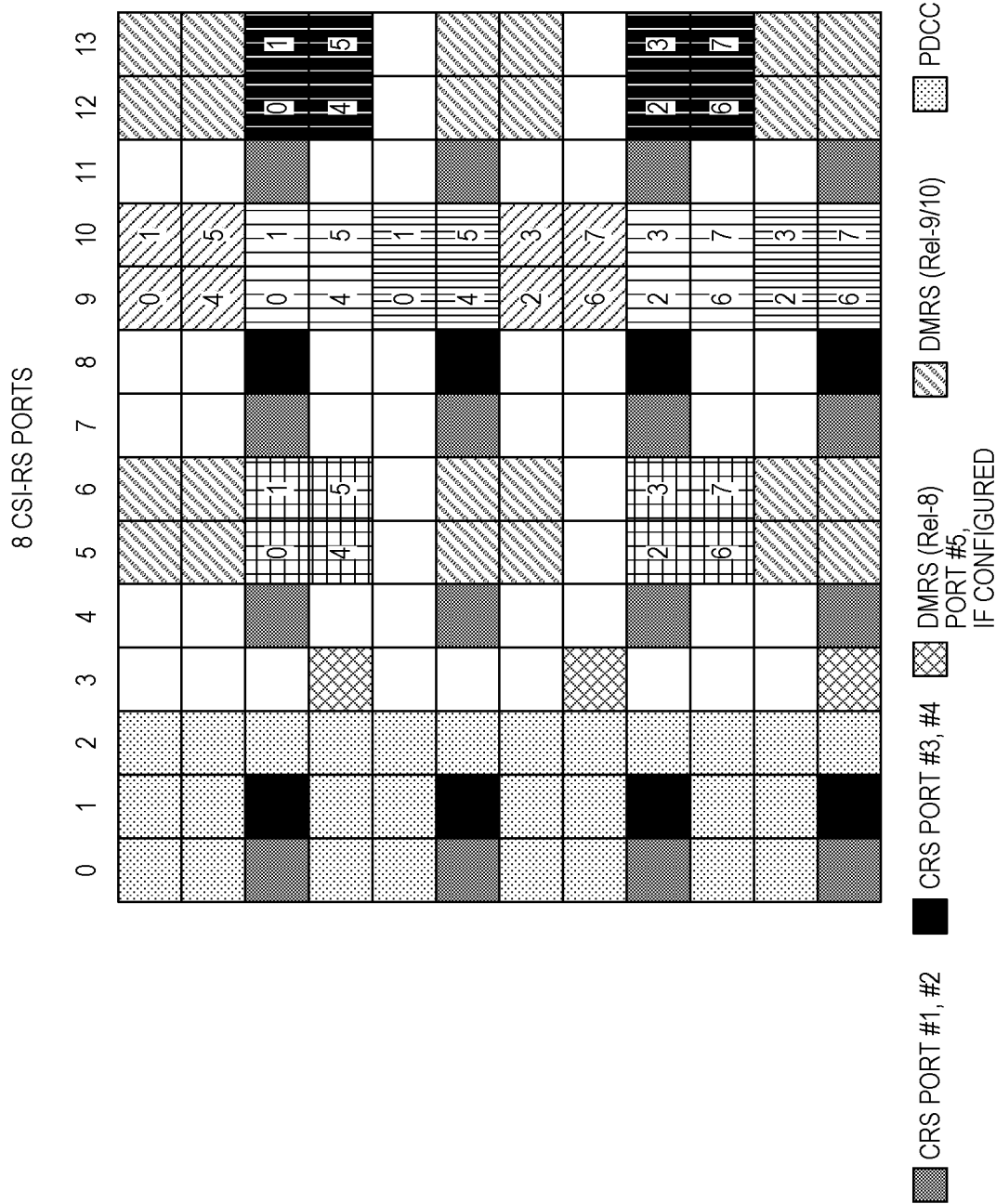
Figure 4:
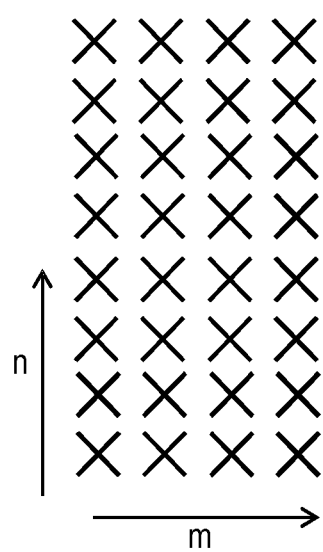
FIG. 4 illustrates a Two-dimensional (2D) antenna.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system. Although terminology from 3GPP LTE has been used in this disclosure as an example, this should not be seen as limiting the scope of the disclosure to only the aforementioned system. Other wireless systems, including Wideband Code Division Multiple Access (WCDMA), WiMax, Ultra Mobile Broadband (UMB), and Global System for Mobile Communications (GSM), may also benefit from exploiting the ideas covered within this disclosure.

Also note that terminology, such as eNB and UE, should be considered non-limiting and does not imply a certain hierarchical relation between the two; in general "eNB" could be considered as device 1 and "UE" device 2, and these two devices communicate with each other over some radio channel. Herein, the focus is on wireless transmissions in the downlink, but the disclosure is equally applicable in the uplink. Other terminology for eNB includes base station, network node, etc. A UE may also be referred to as a wireless communication device, a wireless device, a mobile device, etc.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

In LTE Release12, two, four, and eight antenna port Multiple Input Multiple Output (MIMO) is supported. In Release13, other dimensions, such as antenna arrays with six antenna ports or more than eight antenna ports and with a two-dimensional layout (2D) is under discussion. New Channel State Information Reference Symbol/Signal (CSI- RS) configurations are defined. Particularly, Channel State Information (CSI) configurations having six, ten, twelve, fourteen, and sixteen antenna ports are of interest. Another problem is how to ensure that power boosting of CSI-RS can be applied. The solution to the problem is to efficiently merge multiple existing two, four, or eight antenna port CSI-RS configurations, taking into account power boosting aspects and signaling overhead aspects. Note that an antenna port is sometimes referred to herein as a "port."

While not being limited thereto, some example embodiments are described above. In a first example embodiment, existing CSI-RS signaling is extended to support six CSI-RS port configurations or more than eight CSI-RS ports configurations. CSI-RS ports are mapped to a group of Resource Elements (REs) that may have more CSI-RS REs than CSI-RS ports. The group may be indexed by a CSI-RS configuration index number, and the same CSI-RS configuration index number may be used for ten, twelve, fourteen, and sixteen CSI-RS ports, i.e. the same REs are reserved for ten, twelve, fourteen, and sixteen ports. Similarly, one CSI-RS configuration index may be used for six and eight ports. CSI-RS ports may be mapped within a group to facilitate uniform CSI-RS power boosting across all the configured ports. Length-4 Orthogonal Cover Code (OCC) codes may be used to multiplex four CSI-RS ports over four REs for improving CSI-RS channel estimation. The four REs can be in four Orthogonal Frequency Division Multiplexing (OFDM) symbols of a single subcarrier, four subcarriers of an OFDM symbol, or two OFDM symbols and two subcarriers.

In a second example embodiment, existing CSI-RS signaling is extended to support more than eight CSI-RS ports configurations. Different numbers of REs are used for different numbers of CSI-RS ports, i.e. a different number of REs may be reserved for six, ten, twelve, fourteen, and sixteen ports. Uniform CSI-RS power boosting is allowed across all the configured ports. This example embodiment may have reduced CSI-RS overhead for six, ten, and twelve ports compared to the first example embodiment.

In third and fourth example embodiments, two, four, and eight port CSI-RS resources are enabled to be merged to form CSI-RS resources for six, ten, twelve, fourteen, and sixteen ports. Resources of an 8-port CSI-RS, a 4-port CSI-RS, and a 2-port CSI-RS may be merged to form resources for a 14-port CSI-RS. Resources of two 8-port CSI-RSs may be merged to form resources for a 16 port CSI-RS. Resources of an 8-port CSI-RS may be merged with resources of a 4-port CSI-RS to form resources for a 12-port CSI-RS. Resources of an 8-port CSI-RS may be merged with resources of a 2-port CSI-RS to form resources for a 10-port CSI-RS. Resources of a 4-port CSI-RS may be merged with resources of a 2-port CSI-RS to form resources for a 6-port CSI-RS.

The third and fourth example embodiments may also allow uniform power boosting over all merged CSI-RS ports by introducing the constraint that the merged CSI-RS has at least four CSI-RS REs in each OFDM symbol (so that power can be borrowed from muted REs) in the case of ten, twelve, fourteen, and sixteen CSI-RS ports. For 6-port CSI-RS, the merged CSI-RS has three CSI-RS REs in each OFDM symbol. For merged 16-port CSI-RS, the 8-port CSI-RSs can be flexibly merged. For merged ten, twelve, and fourteen port CSI-RSs, the CSI-RSs to be merged should be chosen from OFDM symbols {9, 10}. For merged six port CSI-RS, the 2-port and 4-port CSI-RSs to be merged should be chosen from the same OFDM symbol pair (among OFDM symbol pairs {5,6}, {9,10}, and {12,13}).

In example embodiment three, at least in some particular embodiments, eleven bits are used to signal (e.g., via Radio Resource Control (RRC) signaling) a merged CSI-RS configuration with six, ten, twelve, fourteen, or sixteen ports. As an example, the first four Most Significant Bits (MSBs) are used to select one or two 8-port CSI-RS configurations, the next three MSBs are used to select one or zero 4-port CSI-RS RE configurations, and the three Least Significant Bits (LSBs) are used to select one or zero 2-port CSI-RS RE configurations.

In example embodiment four, at least in some particular embodiments, seven bits are used to signal (e.g., via RRC signaling) a merged CSI-RS configuration with ten, twelve, fourteen, or sixteen ports. Alternatively, eight bits are used to RRC signal a merged CSI-RS configuration with six, ten, twelve, fourteen, or sixteen ports.

For both example embodiments three and four, the antenna port numbering for the merged CSI-RS resources can be done as follows, as an example. First, the 8-port configuration being merged together is numbered. This is followed by the 4-port configuration (if one is being merged) for which the port numbering continues from the previous 8-port resource and finally the 2-port configuration (if one is being merged together). In case two 8-port CSI-RS configurations are merged together, the 8-port CSI-RS resources with the lowest configuration are numbered first.

In a fifth example embodiment, a bitmap indicates which REs contain CSI-RS. Each bit of the bitmap refers to groups of CSI-RS REs, corresponding to multiple CSI-RS ports. REs within the groups are substantially adjacent in time (adjacent OFDM symbols), in frequency (adjacent subcarriers), or substantially adjacent in both time and frequency. The groups can contain for example two CSI-RS REs adjacent in time, using the CSI-RS RE mapping from LTE Release 12. The groups can also be comprised of four REs, with the REs in adjacent subcarriers and OFDM symbols. The groups may be at fixed locations within an LTE Physical Resource Block (PRB), and such fixed locations can be identified using a predetermined rule. Groups selected by the bitmap are not necessarily in the same OFDM symbols or in adjacent subcarriers.

In the fifth example embodiment, at least in some particular embodiments, the groups are covered with an OCC, and are for example size two or size four, with the size matching the number of REs in the group. The same OCC can be used for each instance of a group within a PRB. When the OCC is of size four, it may be a two dimensional OCC applied across both frequency and time.

In the fifth example embodiment, the bitmap may also indicate which CSI-RS ports are mapped to which groups of REs.

In the fifth example embodiment, each one in the bitmap indicates that a group of CSI-RS ports, for example two CSI-RS ports, are assigned to the group of CSI-REs. The total number of ones in the bitmap indicates the total number of CSI-RS ports; for example if there are seven "1"s in the bitmap, fourteen CSI-RS ports are assigned. The CSI-RS ports may be assigned in monotonically increasing order, for example with port fifteen assigned to the lowest indexed bit in the bitmap. More than one bit of the bitmap may correspond to a CSI-RS RE group. For example, if there are four REs in the group, two bits can correspond to two pairs of CSI-RS ports assigned to the group.

Advantages of the embodiments described herein will be readily apparent to those of skill in the art. Among the advantages are: existing CSI-RS RE patterns can be re-used, no impact on Physical Downlink Shared Channel (PDSCH)

mapping for legacy terminals as legacy Zero Power (ZP) CSI-RS configurations can be used to avoid collision with six, ten, twelve, fourteen, or sixteen port CSI-RS of newer terminals, full coverage recovery by power boosting is ensured by the merge designs, and signaling overhead for configuration is minimized.

In particular, new CSI-RS configurations can be obtained in several ways. For example, one way to obtain CSI-RS configurations is by signaling a merger of multiple existing (two, four, or eight) CSI-RS configurations. For instance, a 12-port CSI-RS configuration can be obtained by merging an 8-port CSI-RS configuration and a 4-port CSI-RS resource. In other words, a 12-port CSI-RS resource can be obtained by merging resources for an 8-port CSI-RS configuration and resources for a 4-port CSI-RS configuration. With this approach six, ten, twelve, and sixteen CSI-RS ports can be obtained by merging two existing configurations. To support fourteen ports, one can merge three existing configurations (8-port CSI-RS configuration+4-port CSI-RS configuration+2-port CSI-RS configuration). Another way to signal a CSI-RS configuration is to signal a bitmap of length equal to the total number of RE pairs that may be used for CSI-RS in legacy LTE (for instance, 20 pairs for Frequency Division Duplexing (FDD) and 32 pairs for Time Division Duplexing (TDD)). The bitmap then indicates to the UE whether a RE pair contains CSI-RS or not. For example, a bitmap with seven "ones" and the remaining bits "zero" indicates the Non-Zero Power (NZP) CSI-RS resources and that a fourteen port CSI-RS resource has been configured. Hence for each pair, the UE assumes an OCC, so that each pair gives two ports.

This disclosure describes several embodiments on how to efficiently signal these CSI-RS resources. Aspects that are considered in the signaling design are also the possibility to perform power boosting. Since each CSI-RS is transmitted from a separate physical antenna, it has its own transmit power amplifier. Moreover, since all other antennas are muted in the REs where one antenna is transmitting, there is a possibility to increase the power of the CSI-RS REs of the transmitting antenna. In other words, the CSI-RS REs used for other antenna ports than for the antenna port transmitted from a particular physical antenna are muted. Hence, power can be "borrowed" from these muted REs (in the same OFDM symbol) to increase the CSI-RS transmit power while maintaining the same total transmit power per antenna.

The power boosting possibility depends on the number of frequency multiplexed antenna ports within one OFDM symbol. For example, when eight CSI-RS ports are configured in OFDM symbols five and six, there are four CSI-RS REs in each of the two OFDM symbols. For each antenna port, the corresponding CSI-RS is transmitted only on one CSI-RS RE per OFDM symbol in each resource block, the other three REs in the same OFDM symbol and the same resource block are muted and no signal is transmitted. Thus, the power that would have been used on those three muted REs can be used to boost the CSI-RS transmitted on the one non-muted RE. Up to 6 decibels (dB) (=10 log 10(4)) power boosting can be applied to the CSI-RS transmission in this example.

When an OCC is used to multiplex CSI-RS signals in either the time, frequency, or both the time and frequency domain, the energy in multiple REs covered by the OCC can be combined at the receiver of the UE. This can increase the Signal to Noise Ratio (SNR) and thus further improve the CSI-RS channel estimation performance. For example, if four or eight CSI-RS ports are co-multiplexed with an OCC, it is possible to increase CSI-RS Signal to Interference plus Noise Ratio (SINR) by 3 or 6 dB relative to the length-2 OCC used in LTE Release 10.

Another aspect to consider is the use of a 2D antenna array. Since the array may be 2D with M vertical ports and N horizontal ports, this could also be considered in an efficient CSI-RS port design.

Figure 5:
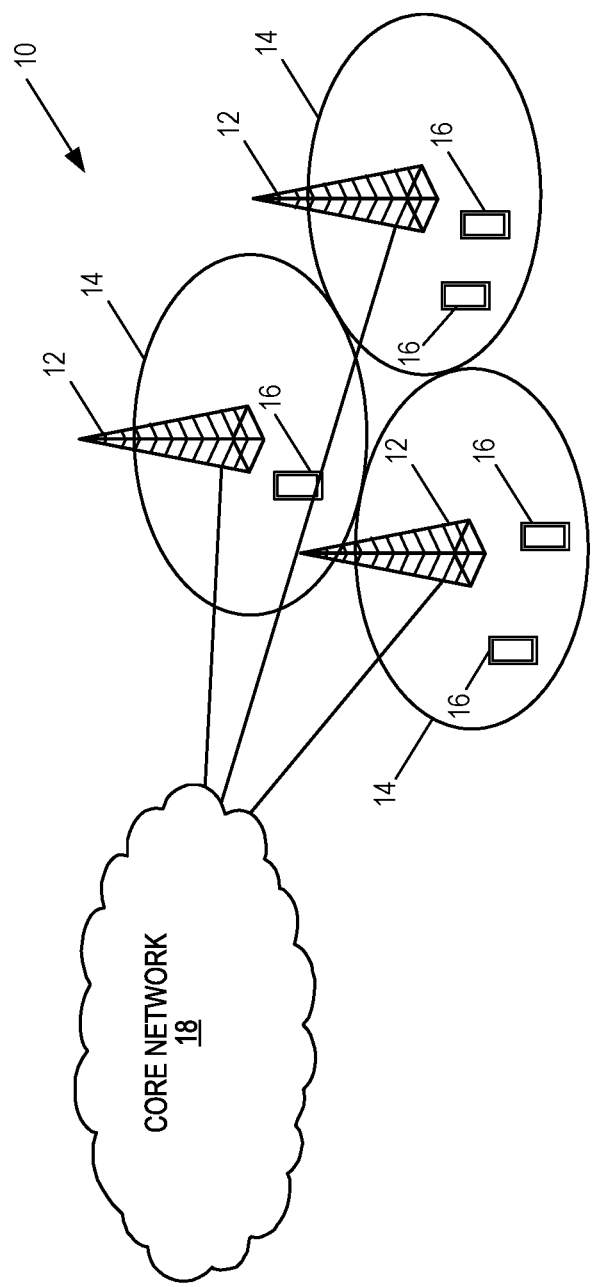
FIG. 5 illustrates one example of a cellular communications network in which 6-port and/or greater than 8-port CSI-RS configurations are provided according to some embodiments of the present disclosure.

Systems and methods relating to 6-port and/or greater than 8-port CSI-RS configurations are disclosed herein. In this regard, FIG. 5 illustrates one example of a cellular communications network 10 in which 6-port and/or greater than 8-port CSI-RS configurations are provided according to some embodiments of the present disclosure. As illustrated, the cellular communications network 10 includes a radio access network that includes a number of base stations 12 (e.g., eNBs), which may more generally be referred to as radio access nodes, serving corresponding cells 14 to thereby provide radio (i.e., wireless) access to a number of wireless devices 16 (e.g., UEs), as will be appreciated by one of ordinary skill in the art. The base stations 12 are communicatively coupled to a core network 18. For 3GPP LTE, the radio access network is an Evolved or Enhanced Universal Terrestrial Radio Access Network (E-UTRAN), and the core network 18 is an Evolved Packet Core (EPC).

As discussed in detail below, a base station 12 configures a number of CSI-RS ports for the wireless device 16. In some embodiments, the base station 12 is enabled to configure the wireless device 16 with greater than eight CSI-RS ports (e.g., ten, twelve, fourteen, or sixteen CSI-RS antenna ports). Further, in some embodiments, the base station 12 is enabled to configure the wireless device 16 with six CSI-RS ports. Conversely, legacy LTE systems only enable CSI-RS configurations for one, two, four, and eight CSI-RS ports. By enabling new CSI-RS configurations for more than eight CSI-RS ports, support is provided for, e.g., MIMO using more than eight Transmit (Tx) antennas and/or 2D antenna arrays.

Extending Existing CSI-RS Configuration Scheme

Figures 6, 7:
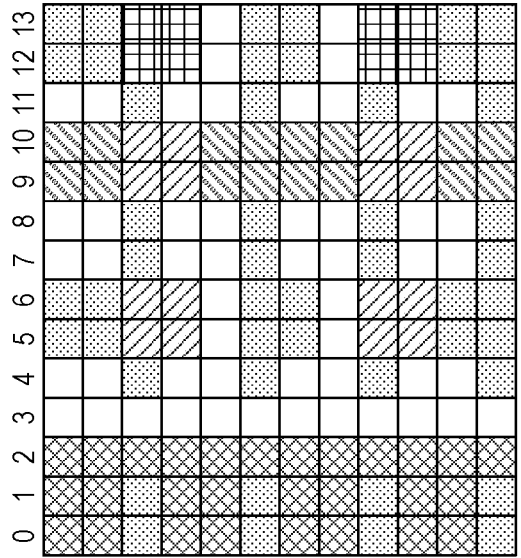
FIG. 6 illustrates an extended CSI-RS configuration table that supports 6-port CSI-RS and 10, 12, 14, and 16-port CSI-RS according to some embodiments of the present disclosure.
FIG. 7 illustrates one example of the corresponding Resource Element (RE) mapping for the two 16-port CSI-RS configurations of FIG. 6.
Figure 8:
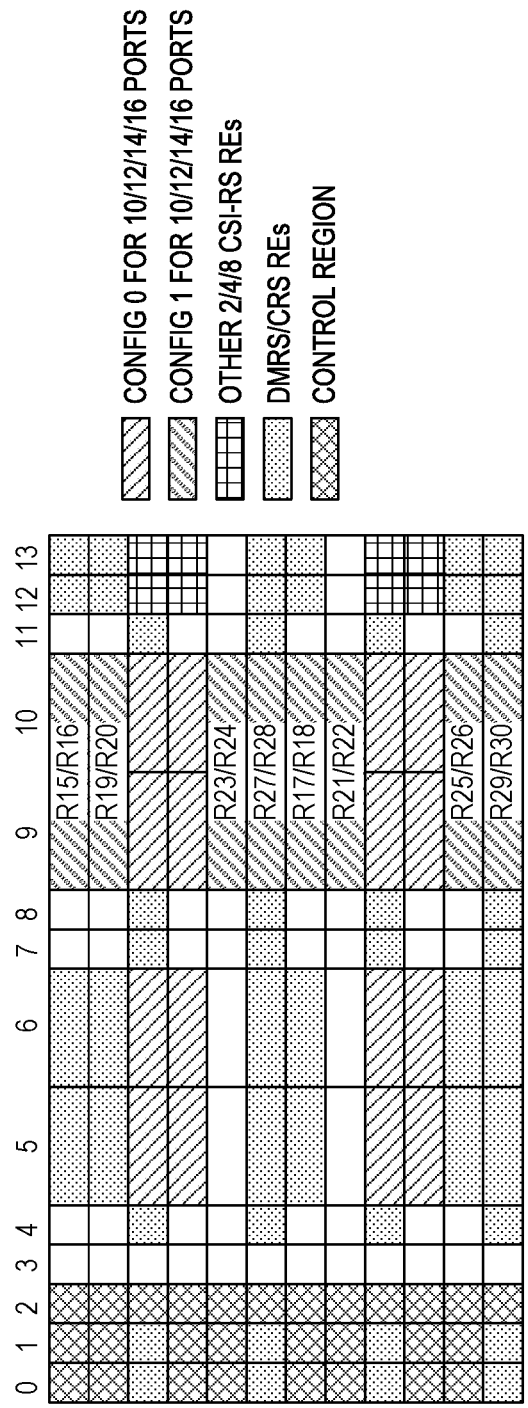
FIG. 8 illustrates an example of the CSI-RS port number to RE mapping for the two 16-port CSI-RS configurations of FIG. 6.
Figures 9, 10:
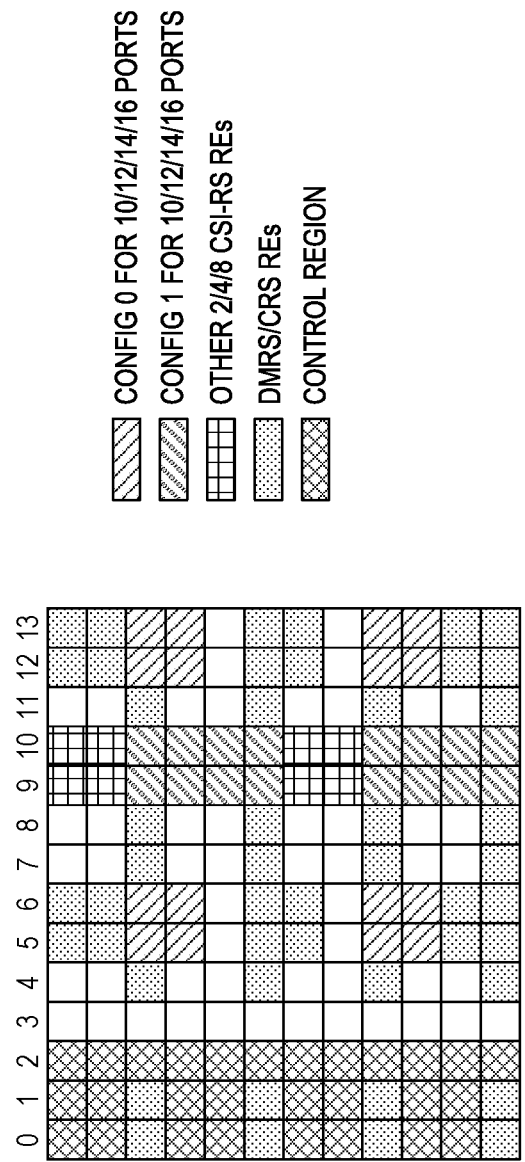
FIG. 9 illustrates another example of two 16-port CSI-RS configurations according to some embodiments of the present disclosure.
FIG. 10 illustrates a corresponding RE mapping for the two 16-port CSI-RS configurations of FIG. 9 according to some embodiments of the present disclosure.

In some embodiments of the present disclosure, the existing LTE Release 10 CSI-RS configuration scheme is extended to support P (P=6,10,12,14,16) ports that is different from the existing two, four, and eight CSI-RS ports, e.g. six, ten, twelve, fourteen, and sixteen ports. Two 8-port resources of the existing CSI-RS configurations can be combined to support a 16-port CSI-RS configuration. An example is shown in FIG. 6, where the existing CSI-RS configuration table is modified to support 6-port CSI-RS and extended by including a new column to support ten, twelve, fourteen, and sixteen port CSI-RS, where this new column is labeled as "10/12/14/16." The new column is selected when the number of CSI-RS ports configured for the wireless device 16 is greater than eight. For instance, if sixteen ports are configured, the wireless device 16 uses the new column to map the CSI-RS configuration to the CSI-RS REs used for the sixteen CSI-RS ports. Two 16-port configurations can be supported in one subframe, one by configuration #0 and the other by configuration #1. An example of the corresponding RE mapping for the two 16-port CSI-RS configurations is shown in FIG. 7. An example of the CSI-RS port number to RE mapping is shown in FIG. 8, where R15/R16 is the resource for CSI-RS ports fifteen and sixteen and R17/R18 is the resource for ports seventeen and eighteen, and so forth. As with the existing standard, two ports occupy two adjacent REs in the time domain and are modulated by a length-2 OCC, e.g. ports fifteen and sixteen are multiplexed in the same resource R15/R16. The CSI-RS ports are mapped to the CSI-RS REs in the frequency domain first and then in the time domain. There are also other alternative configurations by combining the existing two 8-port configurations (combining 8-port CSI-RS configurations #0 and #4). In this regard, another example of two sixteen port CSI-RS configurations is shown in FIG. 9 and the corresponding RE mapping is shown in FIG. 10.

Figure 11:
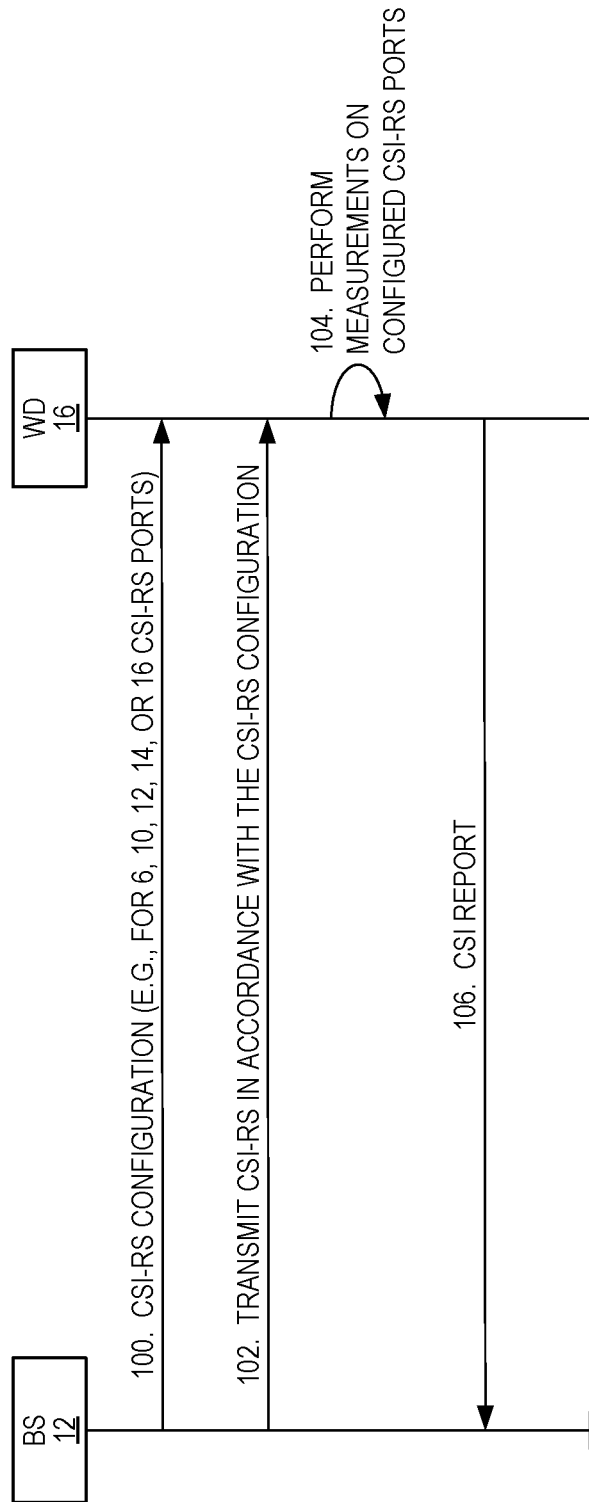
FIG. 11 illustrates the operation of a base station and a wireless device to utilize a new CSI-RS configuration according to some embodiments of the present disclosure.

FIG. 11 illustrates the operation of the base station 12 and the wireless device 16 to utilize one of the new CSI-RS configurations described above according to some embodiments of the present disclosure. As illustrated, the base station 12 configures the wireless device 16 with a CSI-RS configuration (step 100). In other words, the base station 12 signals the CSI-RS configuration to the wireless device 16. In this example, the CSI-RS configuration is either a 6-port CSI-RS configuration or a 10, 12, 14, or 16-port CSI-RS configuration. As described above, the existing CSI-RS configuration table is extended to support the signaled number of CSI-RS ports, where the extension effectively combines two existing (e.g., legacy) CSI-RS configurations to provide the new CSI-RS configuration. In other words, in this embodiment, the new CSI-RS configuration signaled in step 100 is a new CSI-RS configuration that is equivalent to the combination of two (or more) existing CSI-RS configurations, as described above.

The base station 12 transmits CSI-RS in accordance with the CSI-RS configuration signaled to the wireless device 16 in step 100 (step 102). In other words, the CSI-RS configuration is mapped to a set of REs for the configured number of CSI-RS antenna ports (e.g., via the table of FIG. 6 or the table of FIG. 9). The base station 12 transmits the CSI-RS on the configured number of CSI-RS ports using that respective set of REs. The wireless device 16 performs measurements on the configured number of CSI-RS ports in accordance with the CSI-RS configuration (step 104). Again, the CSI-RS configuration (e.g., configuration #0 for sixteen CSI-RS ports) is mapped to a respective set of REs on which the CSI-RS for the sixteen ports are transmitted. The wireless device 16 performs measurements on the CSI-RS for those CSI-RS ports on the respective set of REs. Based on the measurements, the wireless device 16 generates a CSI report and transmits the CSI report to the base station 12 (step 106), as will be appreciated by one of ordinary skill in the art.

In one alternative embodiment, for P CSI-RS ports, where 8<P<16, the same CSI-RS REs of sixteen ports are configured, but only the REs corresponding to CSI-RS ports 15 to 15+P−1 are actually used for transmitting CSI-RS. The remaining REs are left unused, i.e. nothing is transmitted in those leftover REs. So, the RE overhead is the same as in the sixteen ports case. However, this allows uniform power boosting across all the CSI-RS ports. In another alternative embodiment, for P CSI-RS ports, where P=6, the same CSI-RS REs of eight ports are configured, but only the REs corresponding to CSI-RS ports fifteen to 20 are actually used for transmitting CSI-RS, the remaining REs are left unused, i.e. nothing is transmitted in those leftover REs. So, the RE overhead is the same as in the eight ports case. However, this allows uniform power boosting across all the CSI-RS ports. In both the aforementioned cases, the base station 12 signals to the wireless device 16 a configuration of one or multiple legacy CSI-RS configurations but also indicates to the wireless device 16 the number of ports that are actually active (containing NZP), for one or both of the two CSI-RS configurations. The wireless device 16 only measures the P active CSI-RS antenna ports and reports CSI for these P ports.

Figure 12:
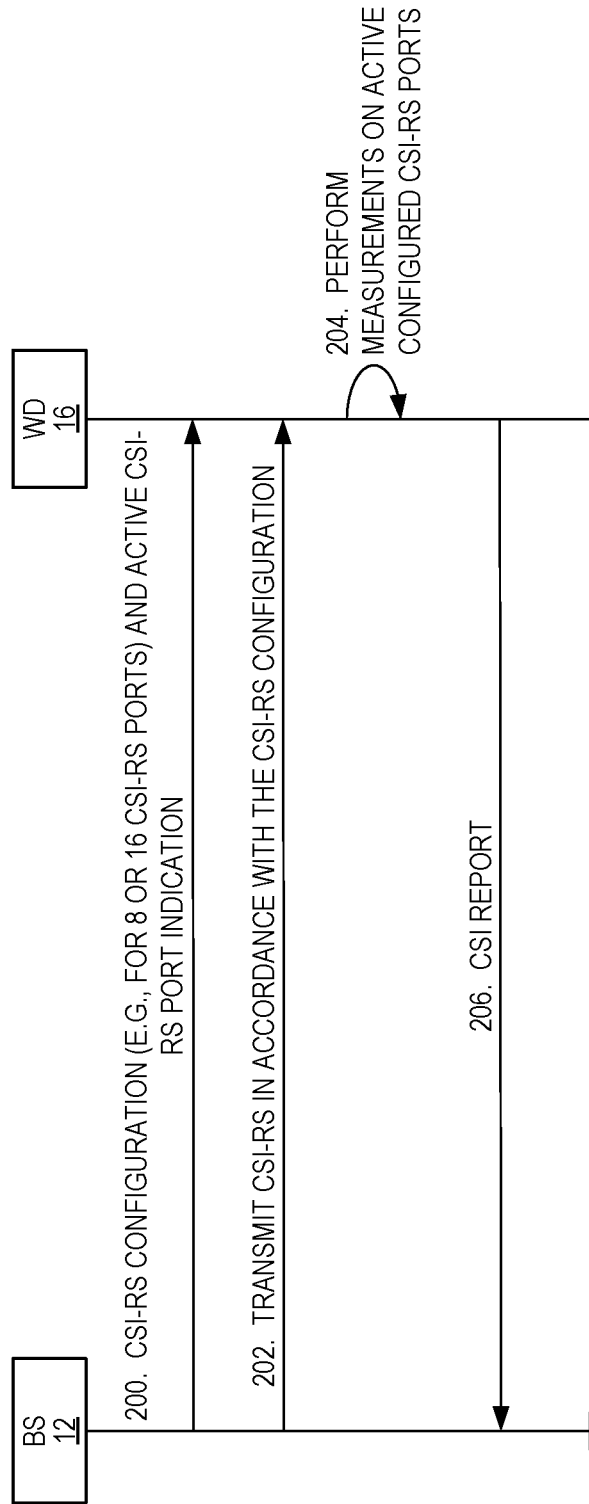
FIG. 12 illustrates the operation of a base station and a wireless device to utilize a new CSI-RS configuration according to some other embodiments of the present disclosure.

This alternative embodiment is illustrated in FIG. 12. As illustrated, the base station 12 signals a CSI-RS configuration to the wireless device 16 along with an indication of the number (P) of active CSI-RS ports (step 200). More specifically, as described above, in some embodiments, the wireless device 16 is configured with a 16-port CSI-RS configuration and the number of active CSI-RS ports is indicated as being ten, twelve, fourteen, or sixteen (i.e., P=10, 12, 14, or 16). In this manner, all of the CSI-RS REs mapped to the 16-port CSI-RS configuration are reserved for CSI-RS; however, CSI-RS is only transmitted on the CSI-RS REs for P of those CSI-RS ports. In other embodiments, the wireless device 16 is configured with an 8-port CSI-RS configuration and the number of active CSI-RS ports is indicated as being either six or eight (i.e., P=6 or 8). In this manner, all of the CSI-RS REs mapped to the 8-port CSI-RS configuration are reserved for CSI-RS; however, CSI-RS is only transmitted on the CSI-RS REs for P of those CSI-RS ports.

The base station 12 transmits CSI-RS in accordance with the CSI-RS configuration signaled to the wireless device 16 in step 200 (step 202). In other words, the number of CSI-RS ports configured for the wireless device 16 by the CSI-RS configuration are mapped to a set of REs (e.g., via the table of FIG. 6 or the table of FIG. 9). The base station 12 transmits the CSI-RS only on the P active CSI-RS ports of the configured number of CSI-RS ports using that respective set of REs (and length-2 OCCs). The wireless device 16 performs measurements only on the active configured CSI-RS ports in accordance with the CSI-RS configuration and the received indication of P (step 204). For example, if the wireless device 16 is configured with a 16-port or 8-port CSI-RS configuration, the wireless device 16 performs measurements only on the first P CSI-RS ports of the configured number of CSI-RS ports. Based on the measurements, the wireless device 16 generates a CSI report and transmits the CSI report to the base station 12 (step 206), as will be appreciated by one of ordinary skill in the art.

Figure 13:
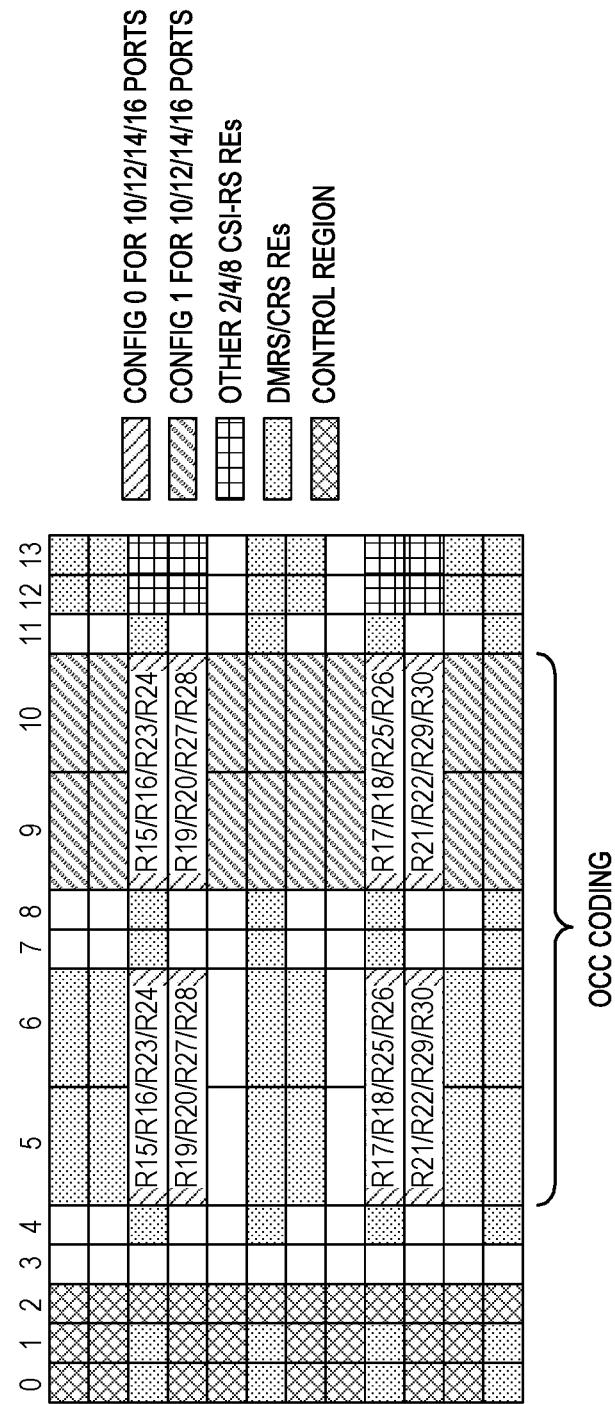
FIG. 13 illustrates an example in which four CSI-RS ports are multiplexed in four REs in the time domain using a length-4 Orthogonal Cover Code (OCC) according to some embodiments of the present disclosure.

In yet another alternative embodiment, one or two 8-port CSI-RS resources are configured and an OCC can be applied across the underlying one or two 8-port resources to achieve six, ten, twelve, fourteen, or sixteen ports. An example for CSI-RS configuration #0 is shown in FIG. 13, where four CSI-RS ports are multiplexed in four REs in the time domain (i.e., in OFDM symbols five, six, nine, and ten) using a length-4 OCC. This allows a flexible number of ports (i.e., P={10, 12, 14, 16}) to be supported with the REs of the 16-port CSI-RS configuration. This would allow for up to 6 dB SINR gains for each CSI-RS port. For CSI-RS configuration #1, OCC can be similarly applied in the frequency domain. In this case, the base station 12 signals to the wireless device 16 a configuration of one or multiple legacy CSI-RS configurations but also indicates how many ports P are active so that the appropriate OCC can be applied for each CSI-RS port. The wireless device 16 only measures the P active CSI-RS antenna ports and reports CSI for these P ports.

With regarding to length-4 OCCs, in some embodiments, applying a length-4 OCC includes applying a conventional length-2 OCC across two OFDM symbols and another length-2 OCC across two subcarriers. So, looking at the group of four REs in OFDM symbols five and six and subcarriers three and four, a first length-2 OCC is applied across OFDM symbols five and six on both subcarriers three and four, a second length-2 OCC is then applied across subcarriers three and four on both OFDM symbols five and six. Together, this applies a length-4 OCC to the group of four REs.

Figure 14:
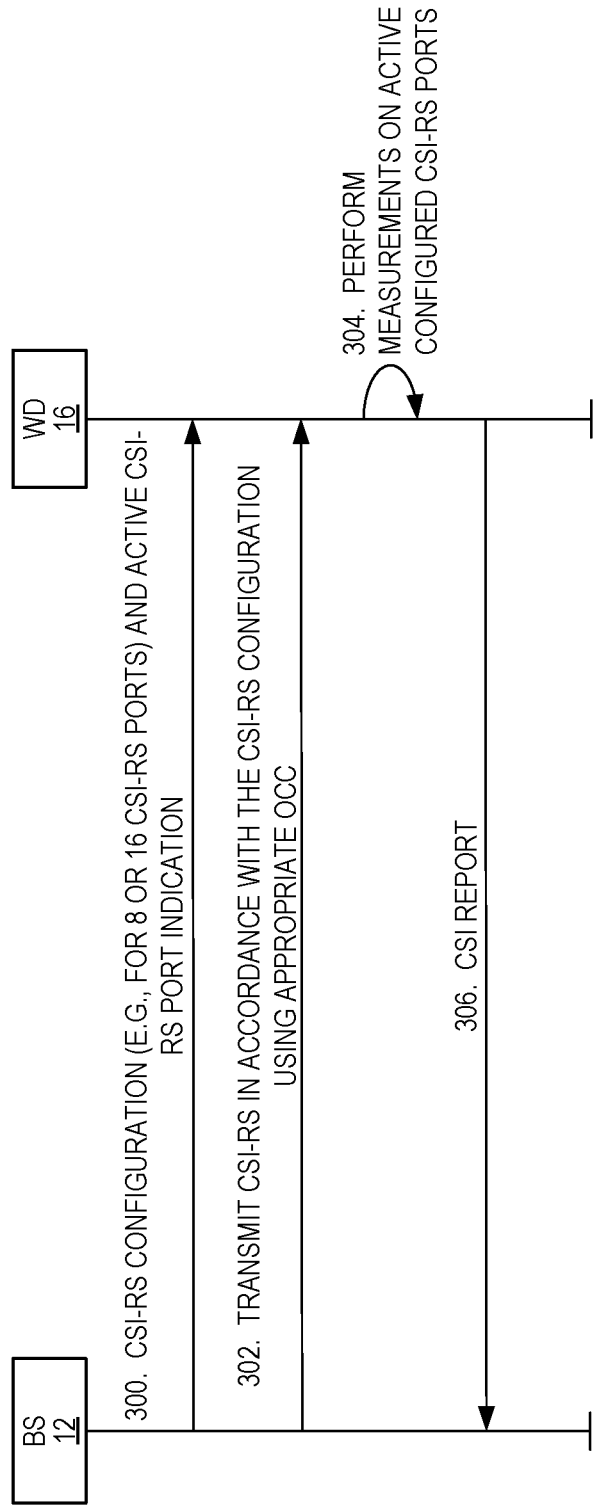
FIG. 14 illustrates the operation of a base station and a wireless device to utilize a new CSI-RS configuration according to some embodiments of the present disclosure.

This alternative embodiment is illustrated in FIG. 14. As illustrated, the base station 12 signals a CSI-RS configuration to the wireless device 16 along with an indication of the number (P) of active CSI-RS ports (step 300). More specifically, as described above, in some embodiments, the wireless device 16 is configured with a 16-port CSI-RS configuration and the number of active CSI-RS ports is indicated as being ten, twelve, fourteen, or sixteen (i.e., P=10, 12, 14, or 16). In this manner, all of the CSI-RS REs mapped to the 16-port CSI-RS configuration are reserved for CSI-RS; however, CSI-RS is only transmitted on the CSI-RS REs for P of those CSI-RS ports. In other embodiments, the wireless device is configured with an 8-port CSI-RS configuration and the number of active CSI-RS ports is indicated as being either six or eight (i.e., P=6 or 8). In this manner, all of the CSI-RS REs mapped to the 8-port CSI-RS configuration are reserved for CSI-RS; however, CSI-RS is only transmitted on the CSI-RS REs for P of those CSI-RS ports.

The base station 12 transmits CSI-RS in accordance with the CSI-RS configuration signaled to the wireless device 16 in step 300 using the appropriate length-4 OCCs (step 302). In other words, the number of CSI-RS ports configured for the wireless device 16 by the CSI-RS configuration are mapped to a set of REs (e.g., via the table of FIG. 6 or the table of FIG. 9) and respective OCCs. The base station 12 transmits the CSI-RS only on the P active CSI-RS ports of the configured number of CSI-RS ports using that respective set of REs and length-4 OCCs. The wireless device 16 performs measurements only on the active configured CSI-RS ports in accordance with the CSI-RS configuration and the received indication of P (step 304). For example, if the wireless device 16 is configured with a 16-port or 8-port CSI-RS configuration, the wireless device 16 performs measurements only on the first P CSI-RS ports of the configured number of CSI-RS ports. Based on the measurements, the wireless device 16 generates a CSI report and transmits the CSI report to the base station 12 (step 306), as will be appreciated by one of ordinary skill in the art.

In many of the examples above, two 8-port CSI-RS configurations are combined to provide a new 16-port CSI-RS configuration (that, at least in some embodiments, flexibly supports ten, twelve, fourteen, or sixteen CSI-RS ports). However, it is also possible to combine, e.g., an 8-port CSI-RS configuration with a 4-port CSI-RS configuration and apply the methods described above to flexibly support ten or twelve port CSI-RS configurations (e.g., provide a 10-port CSI-RS instead of the nominal 12-port CSI-RS).

The benefits of the above new CSI-RS configurations include, for example:
  Re-use of the existing LTE Release 10 CSI-RS configuration signaling.
  Uniform power boosting over all CSI-RS ports (i.e., six, ten, twelve, fourteen, and sixteen ports) because there are equal number of CSI-RS REs in each OFDM symbol for a given configuration (four REs in configuration #0). Also, the configurations allow some tradeoff between the ability to boost CSI-RS power, since configuration #0 is spread over four OFDM symbols, while configuration #1 is spread over two OFDM symbols. Since only one RE is used for transmitting CSI-RS in each OFDM symbol in a resource block on each antenna port, the CSI-RS power can be boosted without increasing the total transmit power per antenna port.
  Furthermore, a length-4 OCC can be used across four CSI-RS REs to provide more received CSI-RS power at the wireless device 16, which complements the power boosting of CSI-RS REs.

Figure 16:
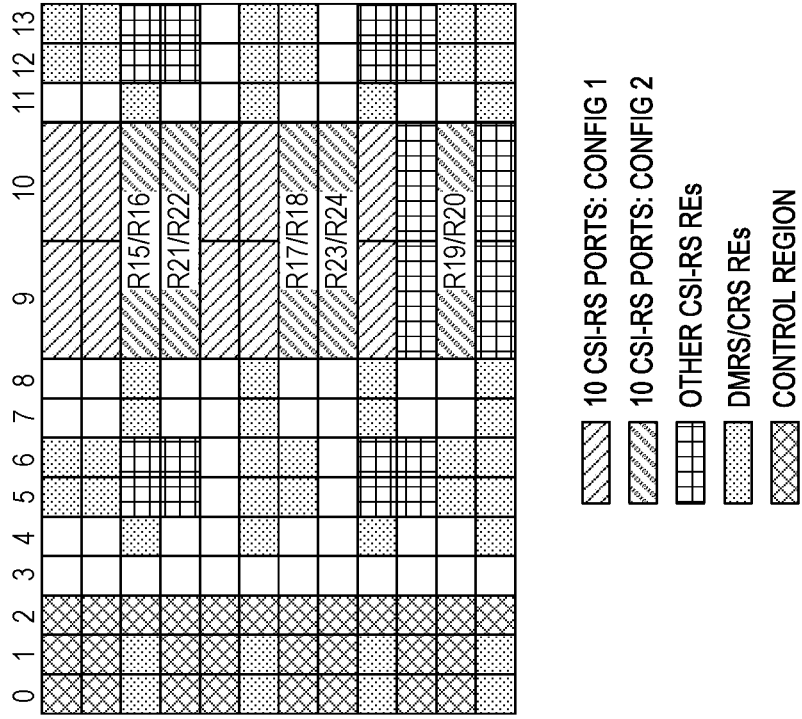
FIG. 16 illustrates example ten CSI-RS port configurations that enable uniform power boosting according to some embodiments of the present disclosure.
Figure 16:
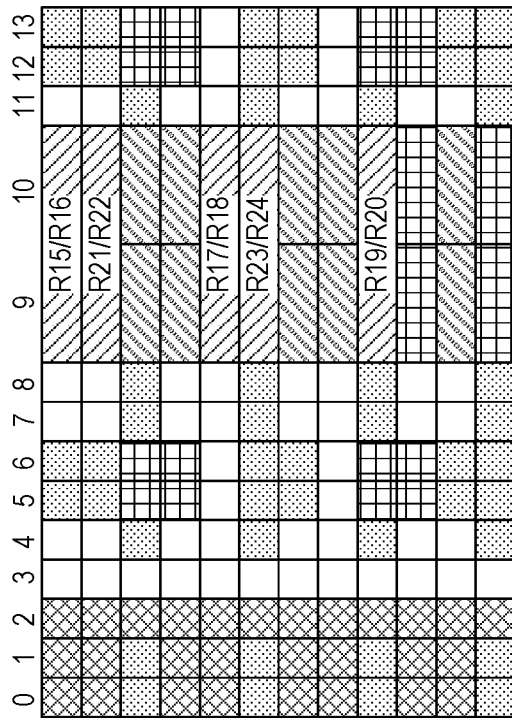
Figure 17:
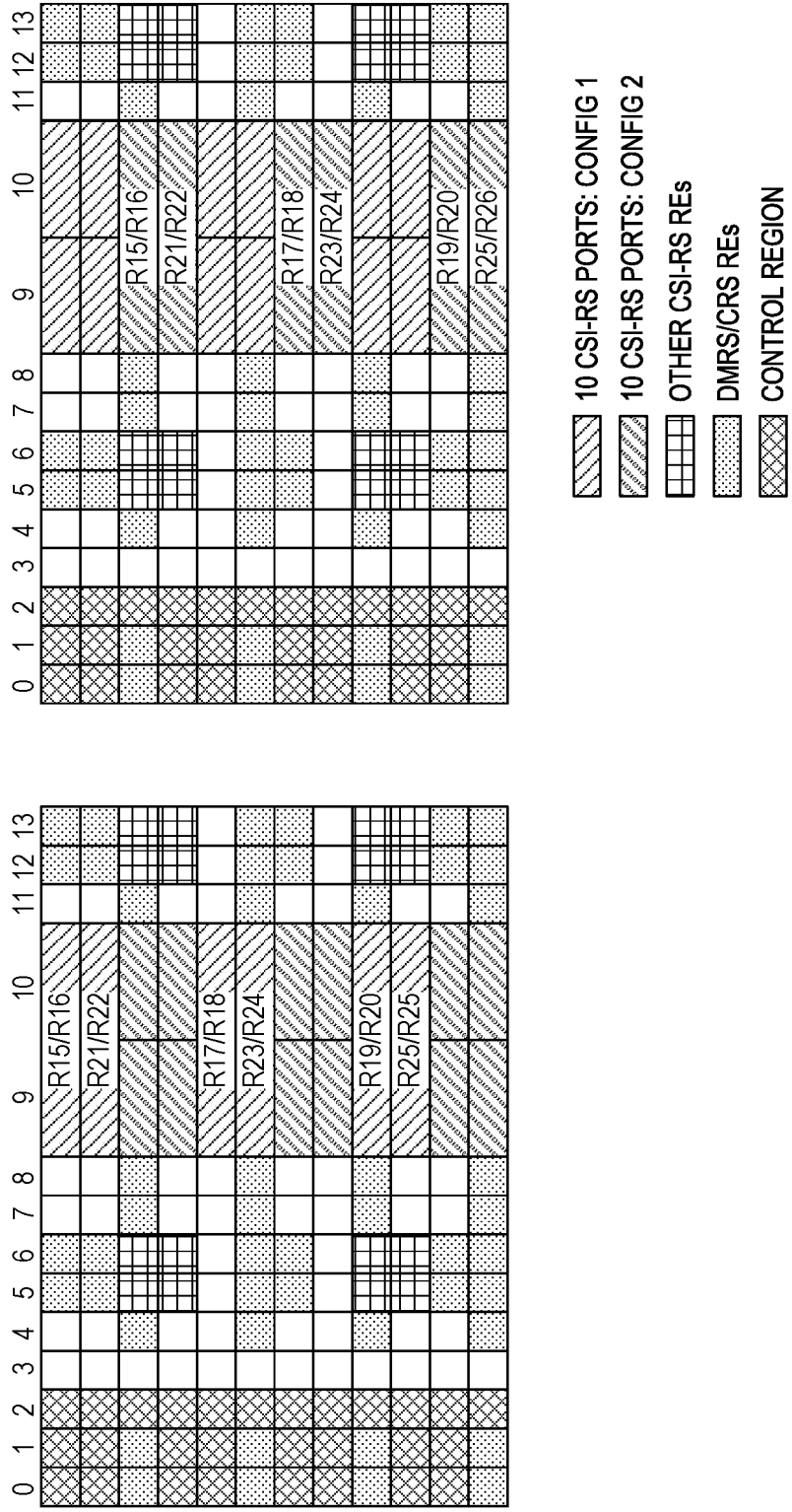
FIG. 17 illustrates example twelve CSI-RS port configurations that enable uniform power boosting according to some embodiments of the present disclosure.

Extending Existing CSI-RS Configuration Scheme with Explicit Resources Allocated to Each New CSI-RS Configuration In some other embodiments of the present disclosure, the existing LTE Release 10 CSI-RS configuration scheme is extended to support six and more than eight CSI-RS ports, e.g. six, ten, twelve, fourteen, and sixteen ports. At least in some embodiments, each of these CSI-RS configurations is equivalent to a combination of two or more of the existing (e.g., legacy) CSI-RS configurations. However, unlike in the embodiments described above, different resources are (explicitly) allocated to the different numbers of CSI-RS ports. An example is shown in FIG. 15, where the existing CSI-RS configuration table is extended by including a new column for each of six, ten, twelve, fourteen, and sixteen CSI-RS ports. For ten and twelve CSI-RS ports, ten and twelve REs are allocated, respectively. Thus, less REs are used compared to the first embodiments described above. To achieve uniform power boosting, only REs in OFDM symbols nine and ten are allocated. An example is shown in FIG. 16 for ten CSI-RS ports and FIG. 17 for twelve CSI-RS ports. In a similar manner, for six CSI-RS ports, six REs are allocated. The signaling for the second embodiments can be as described above with respect to FIG. 11. Further, in some embodiments, length-4 OCCs may be used to multiplex four CSI-RS ports onto four REs, as described above.

The benefits of the second embodiments include, for example:
  Re-use of the existing CSI-RS configuration signaling.
  Uniform power boosting over all CSI-RS ports (i.e., six, ten, twelve, fourteen, and sixteen ports) because there are equal number of CSI-RS REs in each OFDM symbol for each configuration.
  Less overhead for ten and twelve ports compared to the embodiments described above for extending the existing CSI-RS configuration scheme where different resource allocations are not defined for each new CSI-RS configuration.

Merging Existing CSI-RS Configurations

In some other embodiments of the present disclosure, existing LTE Release 10 CSI-RS configurations are merged in order to form ten, twelve, fourteen, and sixteen port CSI-RS resources. An 8-port CSI-RS configuration and a 2-port CSI-RS configuration are merged to form a 10-port CSI-RS configuration/resource; an 8-port CSI-RS configuration and a 4-port CSI-RS configuration are merged to form a 12-port CSI-RS configuration/resource; and two 8-port CSI-RS configurations are merged to form a 16-port port CSI-RS configuration/resource. Likewise, an 8-port CSI-RS configuration, a 4-port CSI-RS configuration, and a 2-port CSI-RS configuration are merged to form a 14-port CSI-RS configuration/resource. Embodiments of the present disclosure relate to efficient configuration signaling of such merged configurations. This signaling takes place between a base station 12 and the wireless device 16, e.g., by the use of higher layer signaling, such as RRC. After the wireless device 16 has been configured with the CSI-RS resources, the wireless device 16 can begin the MIMO channel measurements and CSI reporting. The reported CSI is then used in the subsequent link adaptation and scheduling of the shared data channel (PDSCH) or control channel (Enhanced Physical Downlink Control Channel (EPDCCH)).

Furthermore, to ensure that the Energy per RE (EPRE) can be boosted by 6 dB for all merged CSI-RS ports, embodiments of the present disclosure constrain the signaling so that the merged CSI-RS has at least four CSI-RS REs in each OFDM symbol (so that power can be borrowed from muted REs). This constraint makes the signaling more efficient since it reduces the number of possibilities. Since the existing 8-port CSI-RS already satisfies this constraint, the 16-port CSI-RS resource can be formed by flexibly merging two 8-port CSI-RS configurations. However, for the ten, twelve, and fourteen port cases, the existing CSI-RS configurations to be merged should be chosen from OFDM symbols $\{9,10\}$ in order to meet this constraint.

In order to signal the merged CSI-RS resources in frame structure 1 (FDD), one needs to choose either two 8-port configurations out of the existing five (i.e., to form a merged 16-port CSI-RS configuration) or one 8-port CSI-RS configuration out of the three 8-port CSI-RS configurations that span OFDM symbols $\{9,10\}$ (i.e., to form merged ten, twelve, and fourteen CSI-RS port configurations). The number of possible combinations for an 8-port CSI-RS configuration is $$\binom{5}{2} + \binom{3}{1} = 13.$$

Hence, four bits are used to signal the 8-port configurations to be merged. Noting that OFDM symbols $\{9,10\}$ contain six different 4-port CSI-RS configurations, one needs to choose one or zero 4-port configurations out of these six (i.e., one in the cases of merged 12-port and 14-port and zero in the cases of 10-port and 16-port). This results in $$\binom{6}{1} + \binom{6}{0} = 7$$

different combinations and three bits are used to signal the combinations. Likewise, in the cases of merged 10-port and 14-port CSI-RS configuration, one 2-port configuration needs to be chosen out of the twelve 2-port configurations contained in OFDM symbols $\{9,10\}$. For merged 12-port and 16-port, zero 2-port configurations need to be chosen. Therefore, there are $$\binom{12}{1} + \binom{12}{0} = 13$$

different combinations, which requires four bits to be signaled. Altogether, this embodiment requires eleven bits to signal the merged CSI-RS configuration/resources.

In a further detailed embodiment, let $\{a_{10}a_9a_8a_7a_6a_5a_4a_3a_2a_1a_0\}$ denote the bit string used to signal the merged CSI-RS resources from the base station 12 to the wireless device 16, for instance using higher layer signaling such as RRC. Here, $\{a_{10}a_9a_8a_7\}$ can contain information regarding the 8-port configuration(s) chosen to be merged. Likewise, $\{a_6a_5a_4\}$ and $\{a_3a_2a_1a_0\}$ can respectively contain the 4-port configuration and 2-port configuration to be merged. These bit strings can be associated with the existing CSI-RS configurations of Table 6.10.5.2-1 of 3GPP Technical Specification (TS) 36.211 V12.5.0 (reproduced herein as FIG. 3) as shown in Tables 1-3 below.

TABLE 1

Mapping between $\{a_{10}a_9a_8a_7\}$ and existing 8-port CSI-RS configurations

| $\{a_{10}a_9a_8a_7\}$ | 8-port CSI-RS configuration identities to be merged |
|---|---|
| 0000 | 1 |
| 0001 | 2 |
| 0010 | 3 |
| 0011 | 0, 1 |
| 0100 | 0, 2 |
| 0101 | 0, 3 |
| 0110 | 0, 4 |
| 0111 | 1, 2 |
| 1000 | 1, 3 |
| 1001 | 1, 4 |
| 1010 | 2, 3 |
| 1011 | 2, 4 |
| 1100 | 3, 4 |
| 1101-1111 | None |

TABLE 2

Mapping between $\{a_6a_5a_4\}$ and existing 4-port CSI-RS configurations

| $\{a_6a_5a_4\}$ | 4-port CSI-RS configuration identity to be merged |
|---|---|
| 000 | 1 |
| 001 | 2 |
| 010 | 3 |
| 011 | 6 |
| 100 | 7 |
| 101 | 8 |
| 110-111 | none |

TABLE 3

Mapping between $\{a_3a_2a_1a_0\}$ and existing 2-port CSI-RS configurations

| $\{a_3a_2a_1a_0\}$ | 2-port CSI-RS configuration identity to be merged |
|---|---|
| 0000 | 1 |
| 0001 | 2 |
| 0010 | 3 |
| 0011 | 6 |
| 0100 | 7 |
| 0101 | 8 |
| 0110 | 12 |
| 0111 | 13 |
| 1000 | 14 |
| 1001 | 15 |
| 1010 | 16 |
| 1011 | 17 |
| 1100-1111 | None |

In another alternative embodiment, in addition to the merging possibilities described above for P (P=10, 12, 14, 16) CSI-RS ports, resources from one 4-port and one 2-port existing CSI-RS can be merged to form a 6-port CSI-RS. The existing 4-port and 2-port CSI-RS configurations to be merged should be chosen from adjacent OFDM symbols (i.e., OFDM symbols {5,6}, {9,10}, or {12,13}) to allow for uniform power boosting on all CSI-RS ports. Hence, with this alternative embodiment, the merged six, ten, twelve, fourteen, or sixteen CSI-RS ports can be signaled with eleven bits. For this alternative embodiment, the bit string $\{a_6a_5a_4\}$ containing information regarding the 4-port configuration to be merged can be alternatively mapped to existing 4-port CSI-RS configurations as shown in Table 4 below. The alternative mapping for bit string $\{a_3a_2a_1a_0\}$ containing information regarding the 2-port configuration to be merged can be done as shown in Table 5 below. For the bit string $\{a_{10}a_9a_8a_7\}$, the alternative embodiment can use the same mapping shown in Table 1 above.

TABLE 4

Alternative mapping between $\{a_6a_5a_4\}$ and existing 4-port CSI-RS configurations

| $\{a_6a_5a_4\}$ | 4-port CSI-RS configuration identity to be merged |
| --- | --- |
| 000 | 1 |
| 001 | 2 |
| 010 | 3 |
| 011 | 6 |
| 100 | 7 |
| 101 | 8 |
| 110 | 0 |
| 111 | 4 |

TABLE 5

Alternative mapping between $\{a_3a_2a_1a_0\}$ and existing 2-port CSI-RS configurations

| $\{a_3a_2a_1a_0\}$ | 2-port CSI-RS configuration identity to be merged |
| --- | --- |
| 0000 | 1 |
| 0001 | 2 |
| 0010 | 3 |
| 0011 | 6 |
| 0100 | 7 |
| 0101 | 8 |
| 0110 | 12 |
| 0111 | 13 |
| 1000 | 14 |
| 1001 | 15 |
| 1010 | 16 |
| 1011 | 17 |
| 1100 | 5 |
| 1101 | 11 |
| 1110 | 9 |
| 1111 | 19 |

In a further detailed embodiment, the antenna port numbering for the merged CSI-RS resources can be done as follows. First, the 8-port configuration being merged together is numbered. This is followed by the 4-port configuration (if one is being merged) for which the port numbering continues from the previous 8-port resource and finally the 2-port configuration (if one is being merged together). In case, two 8-port CSI-RS configurations are merged together, the 8-port CSI-RS resources with the lowest configuration are numbered first.

Figure 18:
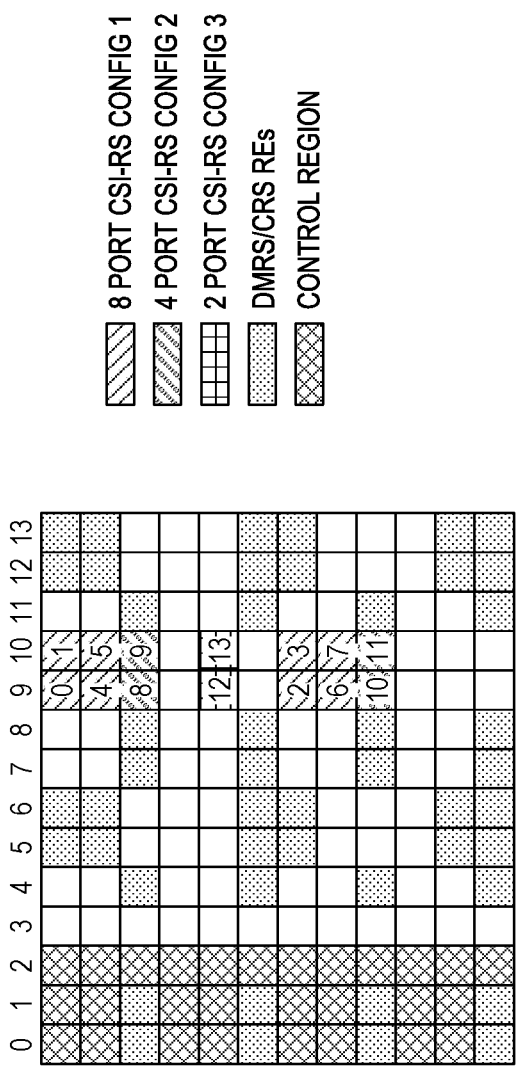
FIG. 18 illustrates one example of a 14-port CSI-RS configuration achieved by merging a number of existing CSI-RS configurations according to some embodiments of the present disclosure.

An example of 14-port merged CSI-RS resources corresponding to the case $\{a_{10}a_9a_8a_7a_6a_5a_4a_3a_2a_1a_0\}=\{00000010010\}$ is shown in FIG. 18. Here, 8-port CSI-RS configuration 1, 4-port CSI-RS configuration 2, and 2-port CSI-RS configuration 3 are merged together. Also shown in FIG. 18 are the antenna port numbers of the merged 14-port CSI-RS resources, where the port numbering carries over from the previous resource.

Figure 19:
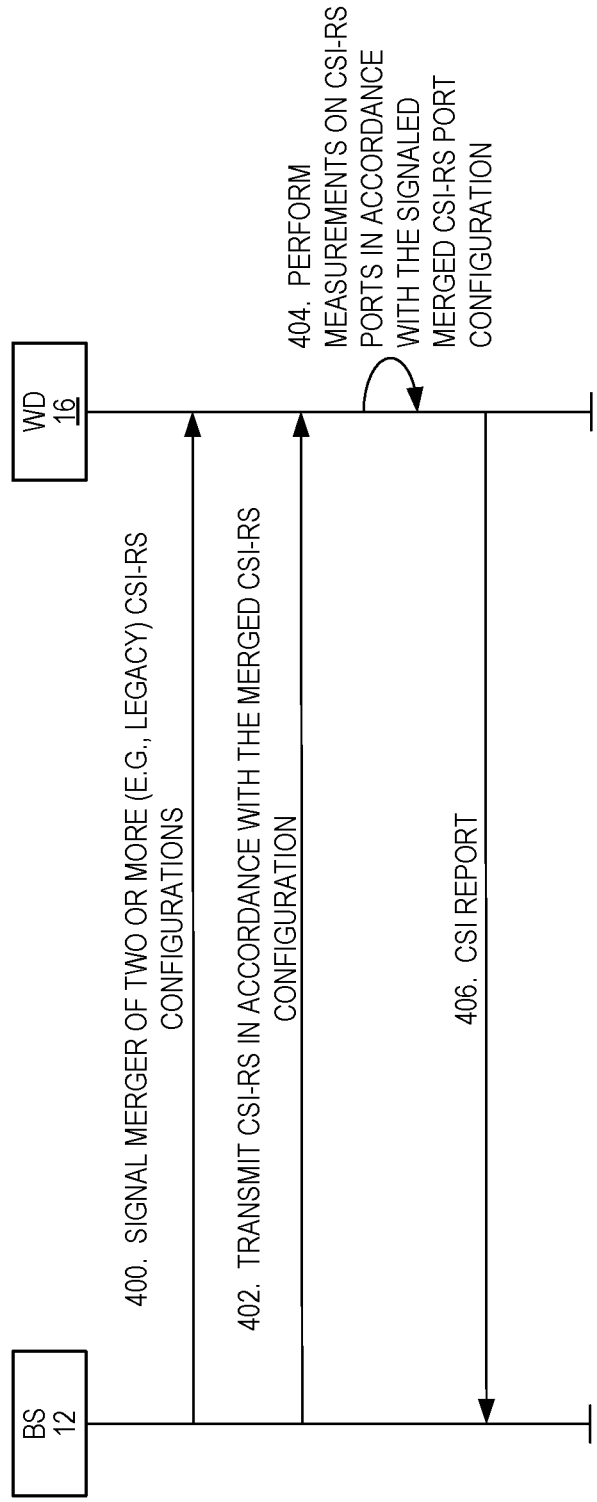
FIG. 19 illustrates the operation of a base station and a wireless device to utilize merged CSI-RS configurations according to some embodiments of the present disclosure.

FIG. 19 illustrates the operation of the base station 12 and the wireless device 16 to utilize merged CSI-RS configurations according to some embodiments of the present disclosure. As illustrated, the base station 12 signals a merger of two or more existing (e.g., legacy) CSI-RS configurations to the wireless device 16 (step 400). More specifically, as described above, in some embodiments, the base station 12 signals a bit sequence to the wireless device 16, where a first set of bits in the bit sequence indicates which, if any, of multiple existing 8-port CSI-RS configurations are to be included in the merger, a second set of bits in the bit sequence that indicates which, if any, of multiple existing 4-port CSI-RS configurations are to be included in the merger, and a third set of bits that indicates which, if any, of multiple existing 2-port CSI-RS configurations are to be included in the merger. Note, however, that the use of a bit sequence to signal the CSI-RS configurations for the merger is only an example. Other techniques may be used. Also note that the mapping between the different bit sequences and the respective combinations may be predefined (e.g., by standard), signaled to the wireless device 18 from the cellular communications network 10, or otherwise known to the wireless device 16.

The base station 12 transmits CSI-RS in accordance with the merged CSI-RS configuration signaled to the wireless device 16 in step 400 (step 402). In other words, the number of CSI-RS ports configured for the wireless device 16 by the merged CSI-RS configuration (i.e., the merger of the two or more existing CSI-RS configurations) are mapped to a set of REs (e.g., via the table of FIG. 3). The wireless device 16 performs measurements on the configured CSI-RS ports in accordance with the merged CSI-RS configuration (step 404). For example, if the wireless device 16 is configured with a 16-port merged CSI-RS configuration, the wireless device 16 performs measurements on the sixteen CSI-RS ports in the merged 16-port CSI-RS configuration. Based on the measurements, the wireless device 16 generates a CSI report and transmits the CSI report to the base station 12 (step 406), as will be appreciated by one of ordinary skill in the art.

The key advantages of the signaling scheme for the embodiments of the merged CSI-RS configuration described above are:

- it enables existing LTE Release 10 CSI-RS ports to be merged to form CSI-RS resources for six, ten, twelve, fourteen, and sixteen ports, and
- it allows uniform power boosting over all merged CSI-RS ports.

Furthermore, unlike embodiment one which has a fixed CSI-RS overhead corresponding to sixteen ports, the CSI-RS overhead in this scheme is proportional to the number of merged CSI-RS ports.

Merging Existing CSI-RS Configurations with Efficient Signaling

In some embodiments, a more efficient way to signal the existing CSI-RS configurations to be merged is provided. Again, this signaling is from the base station 12 to the wireless device 16, and this signaling can be via, for example, RRC. This embodiment builds on the embodiments described above for merging existing CSI-RS configurations, but reduces the signaling overhead while maintaining the key advantages. The reduction of the signaling overhead is provided by first recognizing, for each merged port value, the number of different ways in which existing CSI-RS configurations can be combined to provide that merged port value. This is described as follows:

10-Port CSI-RS Case: As discussed in the embodiments above for merging existing CSI-RS configurations, the existing CSI-RS configurations should be chosen from OFDM symbols {9,10} in order to ensure that the EPRE can be boosted by 6 dB for all merged CSI-RS ports. First, one 8-port configuration is chosen among configurations {1, 2, 3}. Once the 8-port configuration is chosen, there are sixteen remaining CSI-RS REs per resource block in OFDM symbols {9,10} which corresponds to eight different 2-port configurations. Then, one 2-port configuration is chosen from the eight. Hence, the number of combinations for the 10-port case is $$\binom{3}{1} \times \binom{8}{1} = 24.$$

12-Port CSI-RS Case: Similar to the 10-port case, the existing CSI-RS configurations should be chosen from OFDM symbols {9,10} in order to ensure that the EPRE can be boosted by 6 dB for all merged CSI-RS ports. First, one 8-port configuration is chosen among configurations {1, 2, 3}. Once the 8-port configuration is chosen, there are sixteen remaining CSI-RS REs per resource block in OFDM symbols {9,10} which corresponds to four different 4-port configurations. Then, one 4-port configuration is chosen from the four. Hence, the number of combinations for the 12-port case is $$\binom{3}{1} \times \binom{4}{1} = 12.$$

14-Port CSI-RS Case: Similar to the 10-port and 12-port cases, the existing CSI-RS configurations should be chosen from OFDM symbols {9,10} in order to ensure that the EPRE can be boosted by 6 dB for all merged CSI-RS ports. First, one 8-port configuration is chosen from configurations {1, 2, 3}. Once the 8-port configuration is chosen, there are sixteen remaining CSI-RS REs per resource block in OFDM symbols {9,10} which corresponds to four different 4-port configurations. Then, one 4-port configuration is chosen from the four. After the 8-port and 4-port configurations are chosen, there are twelve remaining CSI-RS REs per resource block in OFDM symbols {9,10} which corresponds to six different 2-port configurations. Finally, one 2-port configuration is chosen from the six. Hence, the number of combinations for the 14-port case is $$\binom{3}{1} \times \binom{4}{1} \times \binom{6}{1} = 72.$$

16-Port CSI-RS Case: As discussed above, any two 8-port CSI-RS configurations can be merged to form a merged 16-port CSI-RS configuration. Hence, two 8-port configurations out of the existing five can be chosen (i.e., are available). The number of combinations is then given by $$\binom{5}{2} = 10.$$

Now, the total number of combinations for ten, twelve, fourteen, and sixteen port cases is 118. These 118 combinations can be referred to as a codespace. Then, in this example, seven bits can be used to represent the 118 different combinations in the codespace in an encoded format. Thus, seven bits are needed to signal the merged CSI-RS resources. Let $\{a_6 a_5 a_4 a_3 a_2 a_1 a_0\}$ denote the bit string used to signal the merged CSI-RS resources. These bits strings can be associated with the existing CSI-RS configurations as shown in Table 6 below. As an example, using the signaling in this embodiment, the 14-port merged CSI-RS example of FIG. 18 can be signaled as $\{a_6 a_5 a_4 a_3 a_2 a_1 a_0\} = \{0100100\}$.

TABLE 6

Mapping between $\{a_6 a_5 a_4 a_3 a_2 a_1 a_0\}$ and existing CSI-RS configurations

| $\{a_6 a_5 a_4 a_3 a_2 a_1 a_0\}$ | Number of merged CSI-RS Ports | 2-port CSI-RS configuration identity to be merged | 4-port CSI-RS configuration identity to be merged | 8-port CSI-RS configuration identity/ identities to be merged |
|---|---|---|---|---|
| 0000000 | 10 | 2 | — | 1 |
| 0000001 | 10 | 3 | — | 1 |
| 0000010 | 10 | 7 | — | 1 |
| 0000011 | 10 | 8 | — | 1 |
| 0000100 | 10 | 14 | — | 1 |
| 0000101 | 10 | 15 | — | 1 |
| 0000110 | 10 | 16 | — | 1 |
| 0000111 | 10 | 17 | — | 1 |
| 0001000 | 10 | 1 | — | 2 |
| 0001001 | 10 | 3 | — | 2 |
| 0001010 | 10 | 6 | — | 2 |
| 0001011 | 10 | 8 | — | 2 |
| 0001100 | 10 | 12 | — | 2 |
| 0001101 | 10 | 13 | — | 2 |
| 0001110 | 10 | 16 | — | 2 |
| 0001111 | 10 | 17 | — | 2 |
| 0010000 | 10 | 1 | — | 3 |
| 0010001 | 10 | 2 | — | 3 |
| 0010010 | 10 | 6 | — | 3 |
| 0010011 | 10 | 7 | — | 3 |
| 0010100 | 10 | 12 | — | 3 |
| 0010101 | 10 | 13 | — | 3 |
| 0010110 | 10 | 14 | — | 3 |
| 0010111 | 10 | 15 | — | 3 |
| 0011000 | 12 | — | 2 | 1 |
| 0011001 | 12 | — | 3 | 1 |
| 0011010 | 12 | — | 7 | 1 |
| 0011011 | 12 | — | 8 | 1 |
| 0011100 | 12 | — | 1 | 2 |
| 0011101 | 12 | — | 3 | 2 |
| 0011110 | 12 | — | 6 | 2 |
| 0011111 | 12 | — | 8 | 2 |
| 0100000 | 12 | — | 1 | 3 |
| 0100001 | 12 | — | 2 | 3 |
| 0100010 | 12 | — | 6 | 3 |
| 0100011 | 12 | — | 7 | 3 |
| 0100100 | 14 | 3 | 2 | 1 |
| 0100101 | 14 | 7 | 2 | 1 |
| 0100110 | 14 | 8 | 2 | 1 |
| 0100111 | 14 | 15 | 2 | 1 |
| 0101000 | 14 | 16 | 2 | 1 |
| 0101001 | 14 | 17 | 2 | 1 |
| 0101010 | 14 | 2 | 3 | 1 |

TABLE 6-continued

Mapping between $\{a_6a_5a_4a_3a_2a_1a_0\}$ and existing CSI-RS configurations

| $\{a_6a_5a_4a_3a_2a_1a_0\}$ | Number of merged CSI-RS Ports | 2-port CSI-RS configuration identity to be merged | 4-port CSI-RS configuration identity to be merged | 8-port CSI-RS configuration identity/identities to be merged |
|---|---|---|---|---|
| 0101011 | 14 | 7 | 3 | 1 |
| 0101100 | 14 | 8 | 3 | 1 |
| 0101101 | 14 | 14 | 3 | 1 |
| 0101110 | 14 | 15 | 3 | 1 |
| 0101111 | 14 | 17 | 3 | 1 |
| 0110000 | 14 | 2 | 7 | 1 |
| 0110001 | 14 | 3 | 7 | 1 |
| 0110010 | 14 | 8 | 7 | 1 |
| 0110011 | 14 | 14 | 7 | 1 |
| 0110100 | 14 | 16 | 7 | 1 |
| 0110101 | 14 | 17 | 7 | 1 |
| 0110110 | 14 | 2 | 8 | 1 |
| 0110111 | 14 | 3 | 8 | 1 |
| 0111000 | 14 | 7 | 8 | 1 |
| 0111001 | 14 | 14 | 8 | 1 |
| 0111010 | 14 | 15 | 8 | 1 |
| 0111011 | 14 | 16 | 8 | 1 |
| 0111100 | 14 | 3 | 1 | 2 |
| 0111101 | 14 | 6 | 1 | 2 |
| 0111110 | 14 | 8 | 1 | 2 |
| 0111111 | 14 | 13 | 1 | 2 |
| 1000000 | 14 | 16 | 1 | 2 |
| 1000001 | 14 | 17 | 1 | 2 |
| 1000010 | 14 | 1 | 3 | 2 |
| 1000011 | 14 | 6 | 3 | 2 |
| 1000100 | 14 | 8 | 3 | 2 |
| 1000101 | 14 | 12 | 3 | 2 |
| 1000110 | 14 | 13 | 3 | 2 |
| 1000111 | 14 | 17 | 3 | 2 |
| 1001000 | 14 | 1 | 6 | 2 |
| 1001001 | 14 | 3 | 6 | 2 |
| 1001010 | 14 | 8 | 6 | 2 |
| 1001011 | 14 | 12 | 6 | 2 |
| 1001100 | 14 | 16 | 6 | 2 |
| 1001101 | 14 | 17 | 6 | 2 |
| 1001110 | 14 | 1 | 8 | 2 |
| 1001111 | 14 | 3 | 8 | 2 |
| 1010000 | 14 | 6 | 8 | 2 |
| 1010001 | 14 | 12 | 8 | 2 |
| 1010010 | 14 | 13 | 8 | 2 |
| 1010011 | 14 | 16 | 8 | 2 |
| 1010100 | 14 | 2 | 1 | 3 |
| 1010101 | 14 | 6 | 1 | 3 |
| 1010110 | 14 | 7 | 1 | 3 |
| 1010111 | 14 | 13 | 1 | 3 |
| 1011000 | 14 | 14 | 1 | 3 |
| 1011001 | 14 | 15 | 1 | 3 |
| 1011010 | 14 | 1 | 2 | 3 |
| 1011011 | 14 | 6 | 2 | 3 |
| 1011100 | 14 | 7 | 2 | 3 |
| 1011101 | 14 | 12 | 2 | 3 |
| 1011110 | 14 | 13 | 2 | 3 |
| 1011111 | 14 | 15 | 2 | 3 |
| 1100000 | 14 | 1 | 6 | 3 |
| 1100001 | 14 | 2 | 6 | 3 |
| 1100010 | 14 | 7 | 6 | 3 |
| 1100011 | 14 | 12 | 6 | 3 |
| 1100100 | 14 | 14 | 6 | 3 |
| 1100101 | 14 | 15 | 6 | 3 |
| 1100110 | 14 | 1 | 7 | 3 |
| 1100111 | 14 | 2 | 7 | 3 |
| 1101000 | 14 | 6 | 7 | 3 |
| 1101001 | 14 | 12 | 7 | 3 |
| 1101010 | 14 | 13 | 7 | 3 |
| 1101011 | 14 | 14 | 7 | 3 |
| 1101100 | 16 | — | — | 0, 1 |
| 1101101 | 16 | — | — | 0, 2 |
| 1101110 | 16 | — | — | 0, 3 |
| 1101111 | 16 | — | — | 0, 4 |
| 1110000 | 16 | — | — | 1, 2 |
| 1110001 | 16 | — | — | 1, 3 |
| 1110010 | 16 | — | — | 1, 4 |
| 1110011 | 16 | — | — | 2, 3 |
| 1110100 | 16 | — | — | 2, 4 |
| 1110101 | 16 | — | — | 3, 4 |

In an alternative embodiment, the different number of ways of forming a merged 6-port CSI-RS (by merging an existing 2-port CSI-RS and an existing 4-port CSI-RS) is appended to the mapping in Table 6. As discussed above, the existing 4-port and 2-port CSI-RS configurations to be merged should be chosen from adjacent OFDM symbols (i.e., OFDM symbols $\{5,6\}$, $\{9,10\}$, or $\{12,13\}$) to allow for uniform power boosting on all CSI-RS ports. In OFDM symbol pairs $\{5,6\}$ and $\{12,13\}$, one existing 4-port CSI-RS can be chosen out of the two available in those symbol pairs. This is followed by the choice of one 2-port CSI-RS out of the remaining two that remain after the 4-port CSI-RS has been chosen. Hence, for OFDM symbol pairs $\{5,6\}$ and $\{12,13\}$, the number of possible combinations to form a 6-port CSI-RS is $$2 \times \binom{2}{1} \times \binom{2}{1} = 8.$$

Next, in OFDM symbol pair $\{9,10\}$, one existing 4-port CSI-RS out of the six available in the symbol pair can first be chosen. This is followed by the choice of one 2-port CSI-RS out of the remaining ten that remain after the 4-port CSI-RS has been chosen. Hence, for OFDM symbol pair $\{9,10\}$, the number of possible combinations to form a 6-port CSI-RS is $$\binom{6}{1} \times \binom{10}{1} = 60.$$

Overall, the total number of ways a 6-port CSI-RS can be formed is 60+8=68. In this alternative embodiment, the total number of combinations for six, ten, twelve, fourteen, and sixteen port cases is 118+68=186. This requires eight bits to signal the merged CSI-RS resources.

In operation, the efficient signaling scheme can be used as described above with respect to FIG. 19. In this embodiment, the seven or eight bit sequence described above is signaled to the wireless device 16 to thereby signal the two or more existing CSI-RS configurations to be merged. Note that the mapping between the different bit sequences and the respective combinations may be predefined (e.g., by standard), signaled to the wireless device 18 from the cellular communications network 10, or otherwise known to the wireless device 16.

CSI-RS Configuration Via Indications of a
Collection of Resources (e.g., Via Bitmap)

In some embodiments, CSI-RS resources signaled from the base station 12 to the wireless device 16, using e.g. RRC signaling, are indicated as a collection of RE pairs. A bitmap indicates whether a given RE pair contains CSI-RS or not. In this way, a bitmap of length L=⌊N/2⌋ bits can indicate the resources occupied by any number of CSI-RS ports up to 2 L if there are N REs available for CSI-RS. Furthermore, in designs requiring an even number of CSI-RS ports (such as those using dual polarized antenna arrays), the number of ones in the bitmap also indicates the number of CSI-RS ports, and so a separate indication of the number of CSI-RS ports is not needed.

Figure 20:
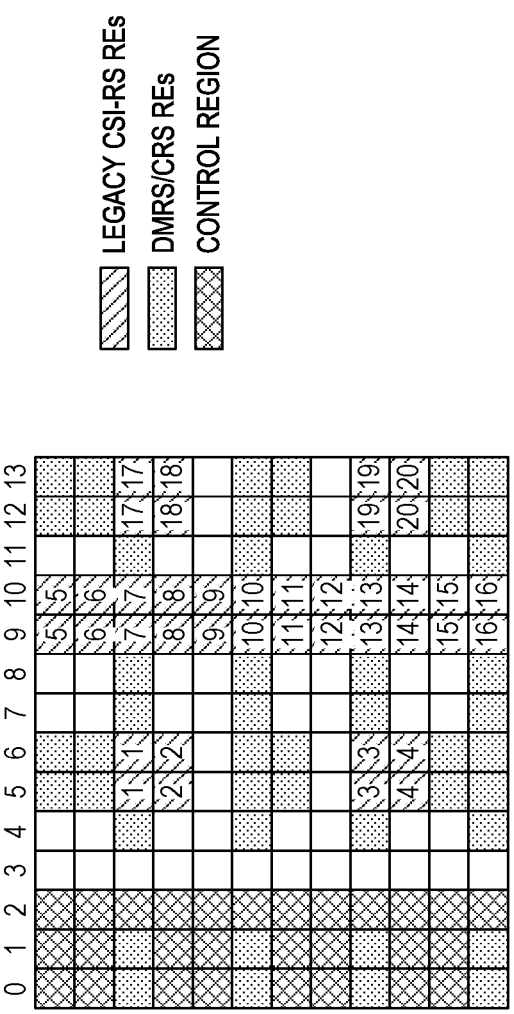
FIG. 20 illustrates the twenty 2-port CSI-RS configurations.

The RE pairs can correspond to those containing Release 10 two port CSI-RS. For example, Release 10 has 20 two port CSI-RS defined, occupying the numbered REs in FIG. 20. Then fourteen CSI-RS ports can be indicated by setting seven bits of a 20 bit bitmap to one, for example a bitmap B=[1100 1011 0000 0000 0011] would indicate that RE pairs numbered 1, 2, 5, 7, 8, 13, and 14 were occupied by CSI-RS.

The CSI-RS port indices may also be assigned. In one approach, the CSI-RS port indices are assigned in monotonically increasing order for each CSI-RS RE pair that has a corresponding bit set to one in the bitmap, starting with the bit corresponding to the lowest indexed RE pair. Therefore, continuing the fourteen CSI-RS port example above with B=[1100 1011 0000 0000 0011], the CSI-RS pairs numbered 1, 2, 5, 7, 8, 13, and 14 correspond to the CSI-RS ports as shown in Table 7 below.

TABLE 7

Assigned CSI-RS resource to CSI-RS port mapping example

| CSI-RS RE pair | | | | | | |
|---|---|---|---|---|---|---|
| 1 | 2 | 5 | 7 | 8 | 13 | 14 |
| CSI-RS ports 15, 16 | 17, 18 | 19, 20 | 21, 22 | 23, 24 | 25, 26 | 27, 28 |

This RE mapping is more flexible than that of "legacy" LTE for up to Release 12, for example, since legacy RE mappings for four or eight CSI-RS ports are constrained to be mapped in two OFDM symbols, and groups of four REs are always adjacent in the frequency domain. The proposed scheme allows more efficient packing of CSI-RS resource when the number of CSI-RS is not a power of two, or when different numbers of CSI-RS ports are used. Furthermore, legacy CSI-RS RE mappings are always in powers of two, and so it is not possible to configure a number of CSI-RS ports that is not a power of two.

This more flexible mapping using the bitmap implies some performance tradeoffs. Since REs in an RE pair are adjacent in time and an OCC length of two is used, it is possible to select the RE pairs in a given CSI-RS configuration to be at any of pair positions within a PRB. By contrast, a longer OCC code would allow more CSI-RS power to be delivered to the wireless device 16 without increasing peak eNB Power Amplifier (PA) power. However, if a longer OCC code is used, pairs should be selected such that they are as close together as possible in time or frequency, such that the channel is relatively constant over the REs covered by an OCC to enable the OCC to remain close to orthogonal. Therefore, this use of an OCC length-2 with a bitmap to select any combination of RE pairs trades off the ability to transmit CSI-RS at higher base station power amplifier efficiency in some frequency selective or time varying channels with the ability to use CSI-RS resources more efficiently.

Figure 21:
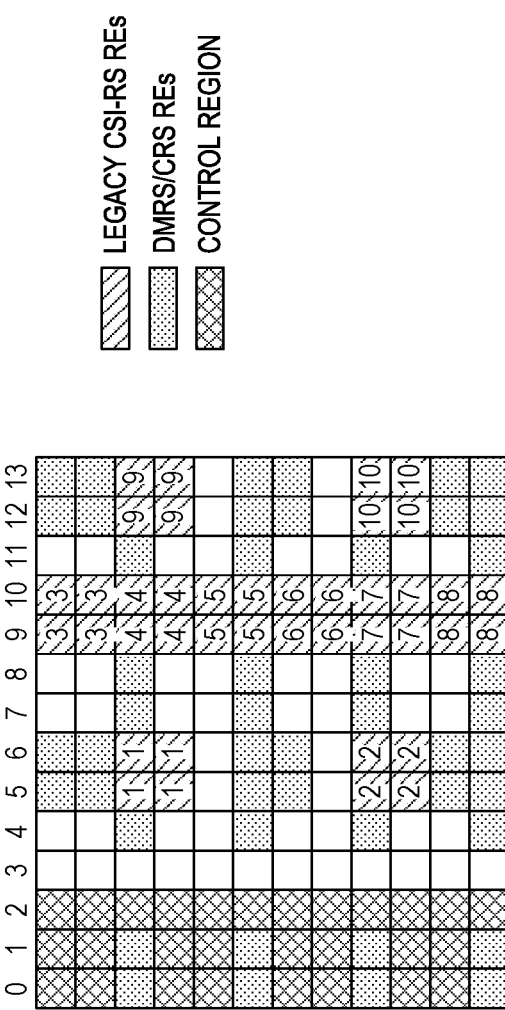
FIG. 21 illustrates RE quadruplets with a 2D OCC of length-2 in both time and frequency that can be utilized according to some embodiments of the present disclosure.

In a variation of this embodiment, RE quadruplets with a 2D OCC of length-2 in both time and frequency is used as shown in FIG. 21. The RE quadruplets are in adjacent REs and in adjacent OFDM symbols. The time dimension of the 2D OCC uses a legacy length-2 OCC across RE pairs in time, where a sequence of [+1 +1] or [+1 −1] modulates the two REs of one subcarrier in adjacent OFDM symbols. The frequency dimension of the 2D OCC also uses a sequence of [+1 +1] or [+1 −1], but modulates the two REs of one OFDM symbol in adjacent subcarriers. Therefore, the 4-weight sequences corresponding to each of four CSI-RS ports multiplexed within a quadruplet may be expressed as:

$$w_0 = \begin{bmatrix} 1 & 1 \\ 1 & 1 \end{bmatrix}, w_1 = \begin{bmatrix} 1 & 1 \\ -1 & -1 \end{bmatrix}, w_2 = \begin{bmatrix} 1 & -1 \\ 1 & -1 \end{bmatrix}, w_3 = \begin{bmatrix} 1 & -1 \\ -1 & 1 \end{bmatrix}$$

where the rows of the matrices correspond to the subcarrier index 'k' and the columns correspond to the OFDM symbol index 'l' in 3GPP TS 36.211.

In this variation, a length 20 bitmap can again be used to indicate which REs contain CSI-RS, even though there are ten different quadruplet positions. This is because it is desirable to have either two or four CSI-RS ports mapped to a quadruplet with designs targeting even numbers of CSI-RS ports. Here, adjacent pairs of bits in the bitmap correspond to each quadruplet. That is, bits (0,1), (2,3), . . . , (18,19) correspond to quadruplets 1, 2, . . . , 10 in FIG. 21, where bits zero, two, and eighteen correspond to the first RE pair in quadruplets one, two, and ten. Therefore, each bit indicates a pair of CSI-RS ports that is mapped to the quadruplet. Furthermore, when either of the two bits corresponding to the quadruplet is set to one, all REs in the quadruplet are occupied by CSI-RS. In one approach, the CSI-RS port numbering increases by two for each one in the bitmap using a similar approach as described above with respect to Table 8, but with the bitmap associated with CSI-RS RE quadruplets rather than CSI-RS RE pairs. That is, a UE signaling a bitmap of B=[1100 1011 0000 0000 0011] would indicate that RE quadruplets numbered 1, 3, 4, and 10 were occupied by CSI-RS, and that CSI-RS ports 15-18 were mapped to quadruplet 1, 19-20 were mapped to quadruplet 3, 21-24 to quadruplet 4, and ports 25-28 are mapped to quadruplet 10.

Because a length-4 OCC is used, 3 dB more power may be transmitted on a CSI-RS port without increasing eNB PA peak to average power ratios relative to a length-2 OCC. On the other hand, the four CSI-RS ports in a quadruplet are adjacent in frequency, and so the ports in a given CSI-RS configuration may be less well distributed in the frequency domain. Furthermore, if there is some variation in the channel across adjacent subcarriers (in highly frequency selective channels), there will be some loss of orthogonality between CSI-RS ports in the quadruplet.

Figure 22:
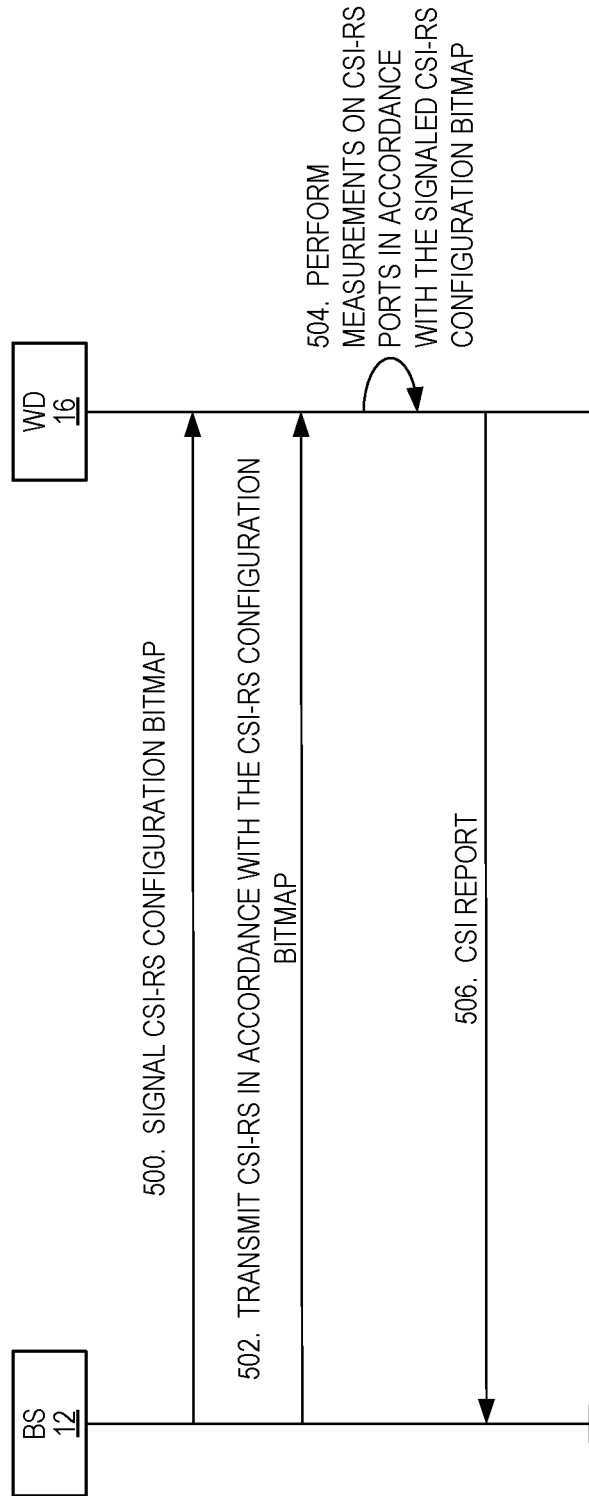
FIG. 22 illustrates the operation of a base station and a wireless device to utilize a bitmap for CSI-RS configuration according to some embodiments of the present disclosure.

FIG. 22 illustrates the operation of the base station 12 and the wireless device 16 to utilize a bitmap for CSI-RS configuration according to some embodiments of the present disclosure. As illustrated, the base station 12 signals a bitmap that indicates a CSI-RS configuration to the wireless device 16 (step 500). This bitmap is sometimes referred to herein as a CSI-RS configuration bitmap. The bitmap includes, for each of a number of CSI-RS RE pairs (or other groupings of one or more CSI-RS REs), an indication, in the form of a bit, that indicates whether that CSI-RS RE pair is used for CSI-RS, as described above.

The base station 12 transmits CSI-RS in accordance with the CSI-RS configuration signaled to the wireless device 16 in step 500 (step 502). In other words, CSI-RS are transmitted on the indicated CSI-RS RE pairs. Further, the number of CSI-RS ports is a function of the number of CSI-RS RE pairs on which CSI-RS is transmitted. For example, in some embodiments, the number of CSI-RS ports is twice the number of CSI-RS RE pairs on which CSI-RS is transmitted. The wireless device 16 performs measurements on the CSI-RS RE pairs for the appropriate number of CSI-RS ports in accordance with the CSI-RS configuration bitmap (step 504). Based on the measurements, the wireless device 16 generates a CSI report and transmits the CSI report to the base station 12 (step 506), as will be appreciated by one of ordinary skill in the art.

Although the described solutions may be implemented in any appropriate type of telecommunication system supporting any suitable communication standards and using any suitable components, particular embodiments of the described solutions may be implemented in an LTE network, such as that illustrated in FIG. 5, which was described above. As shown in FIG. 5, the example network may include one or more instances of wireless devices 16, which are also referred to herein as wireless communication devices 16, (e.g., conventional UEs, MTC/Machine-to-Machine (M2M) UEs) and one or more radio access nodes (e.g., eNBs or other base stations 12) capable of communicating with these wireless devices 16 along with any additional elements suitable to support communication between wireless devices 16 or between a wireless device 16 and another communication device (such as a landline telephone). Although the illustrated wireless devices 16 may represent communication devices that include any suitable combination of hardware and/or software, these wireless devices 16 may, in particular embodiments, represent devices such as the example wireless device 16 illustrated in greater detail by FIGS. 23 and 24. Similarly, although the illustrated base station 12 (or more generally radio access node 12) may represent network nodes that include any suitable combination of hardware and/or software, these nodes may, in particular embodiments, represent devices such as the example radio access node illustrated in greater detail by FIGS. 25 through 27.

Figure 23:
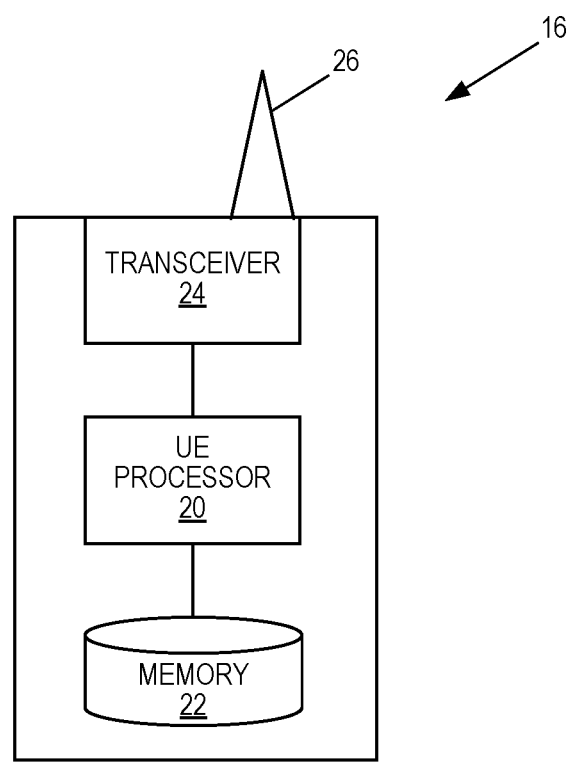
FIGS. 23 and 24 are block diagrams of a wireless device according to some embodiments of the present disclosure.

As shown in FIG. 23, the example wireless device 16 includes a processor 20 (e.g., processing circuitry such as, for example, one or more Central Processing Units (CPUs), one or more Application Specific Integrated Circuits (ASICs), one or more Field Programmable Gate Arrays (FPGAs), and/or the like), memory 22, a transceiver(s) 24, and an antenna(s) 26. In particular embodiments, some or all of the functionality described above as being provided by UEs, MTC or M2M devices, and/or any other types of wireless devices 16 may be provided by the processor 20 executing instructions stored on a computer-readable medium, such as the memory 22 shown in FIG. 23. Alternative embodiments of the wireless device 16 may include additional components beyond those shown in FIG. 23 that may be responsible for providing certain aspects of the device's functionality, including any of the functionality described above and/or any functionality necessary to support the solution described above.

Figure 24:
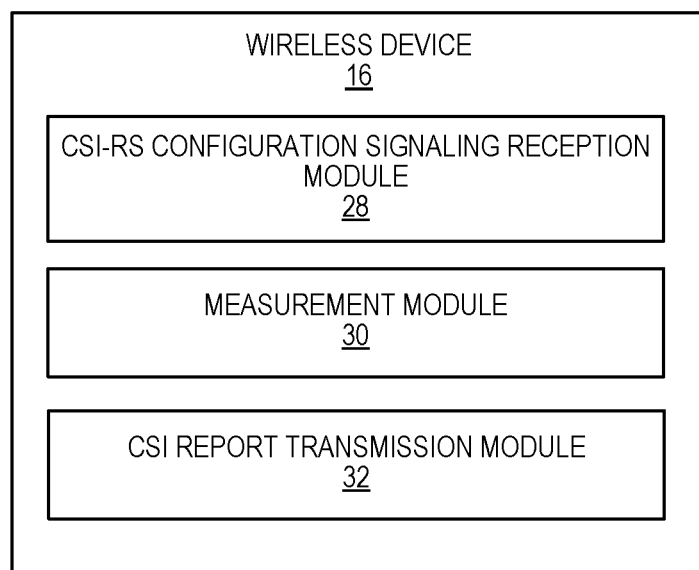

FIG. 24 illustrates the wireless device 16 according to some other embodiments of the present disclosure. As illustrated, the wireless device 16 includes a CSI-RS configuration signaling reception module 28, a measurement module 30, and a CSI report transmission module 32, each of which is implemented in software. The CSI-RS configuration signaling reception module 28 operates to receive configuration of multiple CSI-RS ports from a radio access node, where the CSI-RS ports can be six CSI-RS ports, ten CSI-RS ports, twelve CSI-RS ports, fourteen CSI-RS ports, or sixteen CSI-RS ports, as described above. The measurement module 30 operates to perform measurements on at least a subset of the CSI-RS ports configured for the wireless device 16, as described above. The CSI report transmission module 32 operates to transmit a CSI report to the radio access node based on the measurements, as described above.

Figure 25:
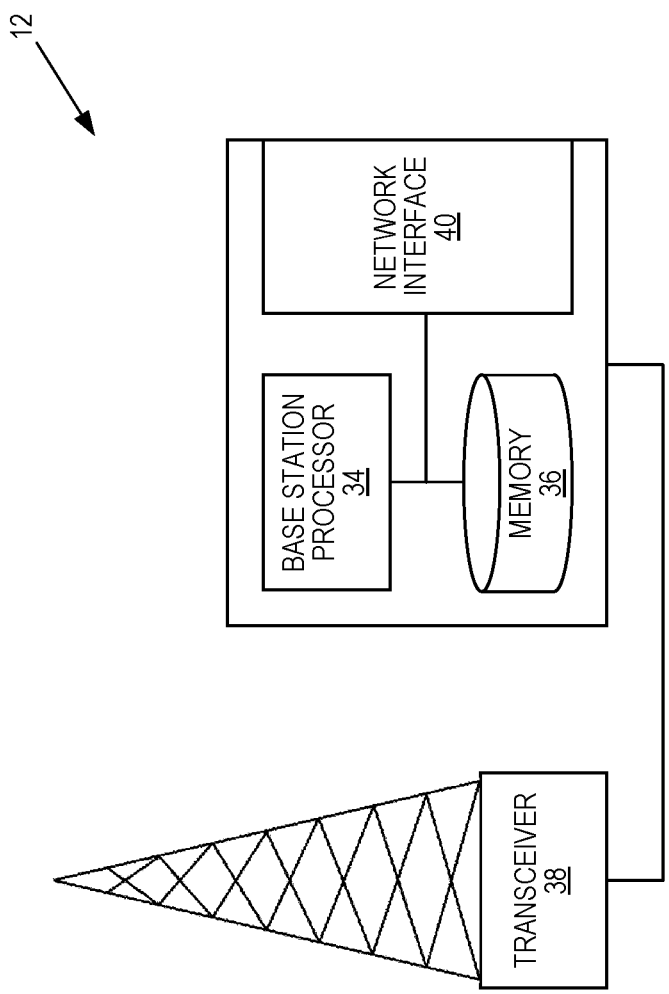
FIGS. 25 through 27 are block diagrams of a radio access node according to some embodiments of the present disclosure.

As shown in FIG. 25, the example base station 12, which is more generally referred to as a radio access node 12, includes a processor 34 (e.g., processing circuitry such as, for example, one or more CPUs, one or more ASICs, one or more FPGAs, and/or the like), memory 36, a transceiver 38, and an antenna(s). As discussed above, in the embodiments described herein, the antenna(s) include multiple antennas. In addition, the base station 12, or more generally the radio access node 12, includes a network interface 40 that enables communication with other network nodes (e.g., nodes in the core network 18). In particular embodiments, some or all of the functionality described above as being provided by a base station, a node B, an eNB, and/or any other type of network node may be provided by the processor 34 executing instructions stored on a computer-readable medium, such as the memory 36 shown in FIG. 25. Alternative embodiments of the radio access node 12 may include additional components responsible for providing additional functionality, including any of the functionality identified above and/or any functionality necessary to support the solution described above.

Figure 26:
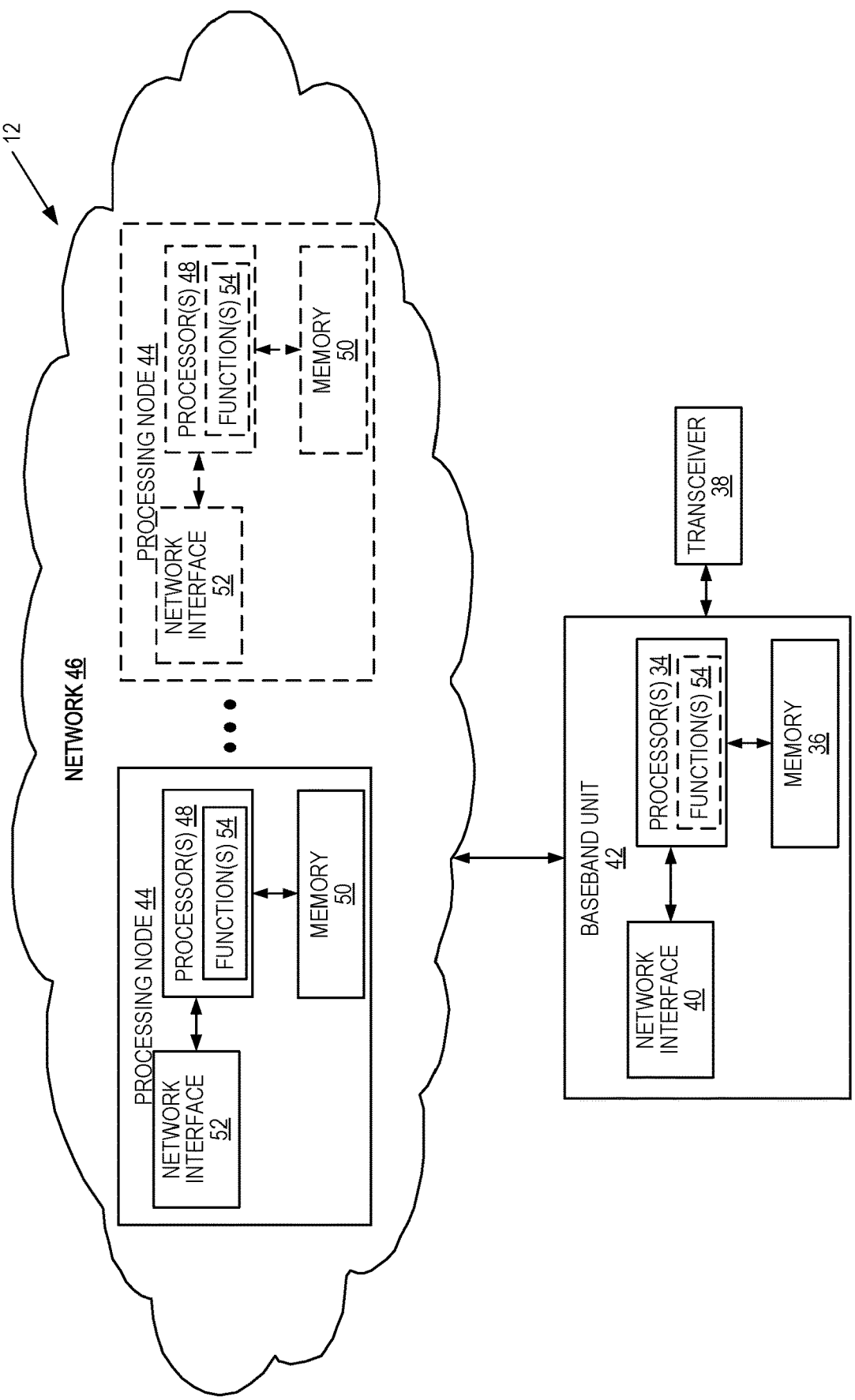

FIG. 26 is a schematic block diagram that illustrates a virtualized embodiment of the base station 12 (more generally a virtualized embodiment of a radio access node) according to some embodiments of the present disclosure. As used herein, a "virtualized" base station (or likewise a "virtualized" radio access node) is a base station in which at least a portion of the functionality of the base station is implemented as a virtual component (e.g., via a virtual machine(s) executing on a physical processing node(s) in a network(s)). As illustrated, the base station 12 includes the processor 34, the memory 36, and the network interface 40 as well as the transceiver 38, as described above. In this example, the processor 34, the memory 36, and the network interface 40 are embodied in a baseband unit 42 that is connected to the transceiver 38 via, for example, an optical cable or the like. The baseband unit 42 is connected to one or more processing nodes 44 coupled to or included as part of a network(s) 46 via the network interface 40. Each processing node 44 includes one or more processors 48 (e.g., CPUs, ASICs, FPGAs, and/or the like), memory 50, and a network interface 52.

In this example, functions 54 of the base station 12 described herein are implemented at the one or more processing nodes 44 or distributed across the baseband unit 42 and the one or more processing nodes 44 in any desired manner. In some particular embodiments, some or all of the functions 54 of the base station 12 described herein are implemented as virtual components executed by one or more virtual machines implemented in a virtual environment(s) hosted by the processing node(s) 44. As will be appreciated by one of ordinary skill in the art, additional signaling or communication between the processing node(s) 44 and the baseband unit 42 is used in order to carry out at least some of the desired functions. Notably, in some embodiments, the baseband unit 42 may not be included, in which case the transceiver 38 communicates directly with the processing node(s) 44 via an appropriate network interface(s).

Figure 27:
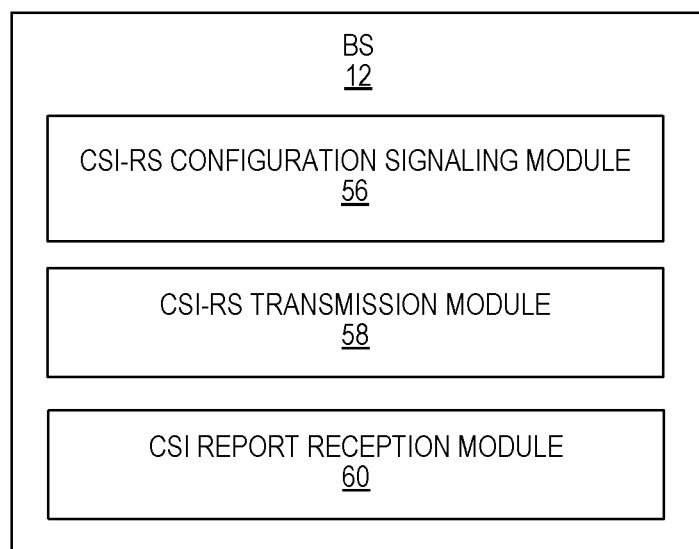

FIG. 27 illustrates the base station 12 according to some other embodiments of the present disclosure. As illustrated, the base station 12 includes a CSI-RS configuration signaling module 56, a CSI-RS transmission module 58, and a CSI report reception module 60, each of which is implemented in software. The CSI-RS configuration signaling module 56 operates to configure CSI-RS ports for a wireless device 16, where the number of CSI-RS ports configured can be six CSI-RS ports, ten CSI-RS ports, twelve CSI-RS ports, fourteen CSI-RS ports, or sixteen CSI-RS ports, as described above. The CSI-RS transmission module 58 operates to transmit CSI-RS on at least a subset of the CSI-RS ports configured for the wireless device 16, as described above. In some embodiments, the CSI report reception module 60 operates to receive CSI reports from the wireless device 16, as described above.

Embodiments of the present disclosure can be implemented by hardware, software, or a combination of hardware and software. Embodiments can be implemented as computer programs tangibly embodied on computer program products, hardware memory, or other structures. Embodiments may be implemented on hardware modules, software modules, or a combination of hardware and software modules.

The following acronyms are used throughout this disclosure.

2D Two-Dimensional
3GPP Third Generation Partnership Project
5G Fifth Generation
ASIC Application Specific Integrated Circuit
CN Core Network
CPU Central Processing Unit
CRS Common Reference Symbol/Signal
CSI Channel State Information
CSI-RS Channel State Information Reference Symbol/Signal
dB Decibel
DFT Discrete Fourier Transform
eNB Enhanced or Evolved Node B
EPC Evolved Packet Core
EPDCCH Enhanced Physical Downlink Control Channel
EPRE Energy per Resource Element
E-UTRAN Evolved or Enhanced Universal Terrestrial Radio Access Network
FDD Frequency Division Duplexing
FPGA Field Programmable Gate Array
GSM Global System for Mobile Communications
ID Identifier
LSB Least Significant Bit
LTE Long Term Evolution
M2M Machine-to-Machine
MIMO Multiple Input Multiple Output
MME Mobility Management Entity
MSB Most Significant Bit
MTC Machine Type Communication
NZP Non-Zero Power
OCC Orthogonal Cover Code
OFDM Orthogonal Frequency Division Multiplexing
PDN Packet Data Network
PDSCH Physical Downlink Shared Channel
P-GW Packet Data Network Gateway
PRB Physical Resource Block
PMI Precoder Matrix Indicator
RE Resource Element
RRC Radio Resource Control
SCEF Service Capability Exposure Function
SINR Signal to Interference plus Noise Ratio
SNR Signal to Noise Ratio
TDD Time Division Duplexing
TFRE Time/Frequency Resource Element
TS Technical Specification
Tx Transmit
UE User Equipment
UMB Ultra Mobile Broadband
WCDMA Wideband Code Division Multiple Access
ZP Zero Power Those skilled in the art will recognize improvements and modifications to the embodiments of the present disclosure. All such improvements and modifications are considered within the scope of the concepts disclosed herein and the claims that follow.

What is claimed is:

1. A method of operation of a radio access node in a cellular communications network, comprising:
configuring a plurality of Channel State Information Reference Signal (CSI-RS) ports for a wireless device, the plurality of CSI-RS ports comprising at least one 8-port configuration, wherein the plurality of CSI-RS ports is allocated in a subset of Resource Elements (REs) contained in a Resource Block (RB); and
transmitting CSI-RS on the plurality of CSI-RS ports, wherein:
the plurality of CSI-RS ports are configured such that there is a corresponding number of CSI-RS REs in each Orthogonal Frequency Division Multiplexing (OFDM) symbol of the RB in which CSI-RS is present,
the plurality of CSI-RS ports containing CSI-RS transmission satisfy uniform power boosting across the CSI-RS ports containing the CSI-RS transmission,
a group of four CSI-RS ports of the plurality of CSI-RS ports configured for the wireless device are mapped to a group of four CSI-RS REs and transmitting the CSI-RS comprises multiplexing CSI-RS for the group of four CSI-RS ports onto the group of four CSI-RS REs using respective length-4 Orthogonal Cover Codes (OCCs), and
the plurality of CSI-RS ports containing the CSI-RS transmission satisfies Signal to Interference plus Noise Ratio, SINR, improvement of at least 3 decibels, dB, for each of the CSI-RS ports containing the CSI-RS transmission over a case where two CSI-RS ports are multiplexed onto two CSI-RS REs using length-2 OCCs.

2. The method of claim 1, wherein the group of four CSI-RS REs are in two Orthogonal Frequency Division Multiplexing (OFDM) symbols on two subcarriers.

3. The method of claim 2, wherein multiplexing CSI-RS for the group of four CSI-RS ports onto the group of four CSI-RS REs using respective length-4 OCCs comprises, for each of the two subcarriers, applying a first length-2 OCC on the two OFDM symbols and for each of the two OFDM symbols, applying a second length-2 OCC on the two subcarriers, the first length-2 OCC being an OCC used across OFDM symbols for CSI-RS configurations of 2, 4, or 8 ports.

4. The method of claim 2, wherein the two OFDM symbols are adjacent in time and the two subcarriers are adjacent in frequency.

5. The method of claim 1, wherein:
there is a plurality of predefined CSI-RS configurations comprising multiple predefined 8-port CSI-RS configurations, multiple predefined 4-port CSI-RS configurations, and multiple predefined 2-port CSI-RS configurations; and
configuring the plurality of CSI-RS ports for the wireless device comprises configuring a merger of two or more of the plurality of predefined CSI-RS configurations for the wireless device, wherein the two or more of the plurality of predefined CSI-RS configurations for the merger are limited to combinations of two or more of a plurality of predefined CSI-RS configurations that result in at least four CSI-RS REs per Physical Resource Block, PRB, per Orthogonal Frequency Division Multiplexing, OFDM, symbol that contains CSI-RS.

6. The method of claim 5, wherein the two or more predefined CSI-RS configurations comprise two predefined 8-port CSI-RS configurations such that the CSI-RS ports configured for the wireless device is sixteen CSI-RS ports.

7. The method of claim 1, wherein the CSI-RS ports configured for the wireless device comprises more than eight CSI-RS ports, and configuring the CSI-RS ports for the wireless device comprises signaling one of two or more predefined 16-port CSI-RS configurations to the wireless device.

8. A radio access node for a cellular communications network, comprising:
a transceiver;
a processor; and
memory storing software instructions executable by the processor whereby the radio access node is operable to:
configure a plurality of Channel State Information Reference Signal (CSI-RS) ports for a wireless device, the plurality of CSI-RS ports comprising at least one 8-port configuration, wherein the plurality of CSI-RS ports is allocated in a subset of Resource Elements (REs) contained in a Resource Block (RB); and
transmit CSI-RS on the plurality of CSI-RS ports, wherein:
the plurality of CSI-RS ports are configured such that there is a corresponding number of CSI-RS REs in each Orthogonal Frequency Division Multiplexing (OFDM) symbol of the RB in which CSI-RS is present,
the plurality of CSI-RS ports containing CSI-RS transmission satisfy uniform power boosting across the CSI-RS ports containing the CSI-RS transmission,
a group of four CSI-RS ports of the plurality of CSI-RS ports configured for the wireless device are mapped to a group of four CSI-RS REs and transmitting the CSI-RS comprises multiplexing CSI-RS for the group of four CSI-RS ports onto the group of four CSI-RS REs using respective length-4 OCCs, and
the plurality of CSI-RS ports containing the CSI-RS transmission satisfies Signal to Interference plus Noise Ratio, SINR, improvement of at least 3 decibels, dB, for each of the CSI-RS ports containing the CSI-RS transmission over a case where two CSI-RS ports are multiplexed onto two CSI-RS REs using length-2 Orthogonal Cover Codes (OCCs).

9. The radio access node of claim 8, wherein the group of four CSI-RS REs are in two Orthogonal Frequency Division Multiplexing (OFDM) symbols on two subcarriers.

10. The radio access node of claim 8, wherein the two or more predefined CSI-RS configurations comprise two predefined 8-port CSI-RS configurations such that the plurality of CSI-RS ports configured for the wireless device is sixteen CSI-RS ports.

11. A method of operating a wireless device in a cellular communication network, the method comprising:
receiving, from a radio access node, a configuration of a plurality of sixteen Channel State Information Reference Signal (CSI-RS) ports, wherein the CSI-RS ports are allocated in a subset of Resource Elements (REs) contained in a Resource Block (RB) and the CSI-RS ports are configured such that there is a corresponding number of CSI-RS REs in each Orthogonal Frequency Division Multiplexing (OFDM) symbol of the RB in which the CSI-RS is present;
wherein the plurality of CSI-RS ports containing the CSI-RS transmission satisfies uniform power boosting across the plurality of CSI-RS ports containing the CSI-RS transmission, and
wherein the plurality of CSI-RS ports containing the CSI-RS transmission satisfies Signal to Interference plus Noise Ratio, SINR, improvement of at least 3 decibels, dB, for each of the CSI-RS ports containing the CSI-RS transmission over a case where two CSI-RS ports are multiplexed onto two CSI-RS REs using length-2 Orthogonal Cover Codes, OCCs.

12. The method of claim 11, further comprising:
performing measurements on the plurality of CSI-RS ports configured for the wireless device; and
transmitting a Channel State Information (CSI) report to the radio access node based on the measurements.

13. The method of claim 11, wherein a group of four CSI-RS ports of the plurality of CSI-RS ports configured for the wireless device are mapped to a group of four CSI-RS REs and CSI-RS for the group of four CSI-RS ports are multiplexed onto the group of four CSI-RS REs using respective length-4 OCCs.

14. The method of claim 11, wherein the group of four CSI-RS REs are in two Orthogonal Frequency Division Multiplexing (OFDM) symbols on two subcarriers.

15. The method of claim 11, wherein receiving configuration of the CSI-RS ports comprises receiving a bit map that is an indication of which of a plurality of predefined CSI-RS resources contain CSI-RS.

16. A wireless device for a cellular communications network, comprising:
a transceiver;
a processor; and
memory storing software instructions executable by the processor whereby the wireless device is operable to:
receive, from a radio access node, a configuration comprising at least one set of 8 Channel State Information Reference Signal (CSI-RS) ports, wherein the CSI-RS ports are allocated in a subset of Resource Elements (REs) contained in a Resource Block (RB) and the CSI-RS ports are configured such that there is an corresponding number of CSI-RS REs in each Orthogonal Frequency Division Multiplexing (OFDM) symbol of the RB in which the CSI-RS is present;
wherein the CSI-RS ports containing the CSI-RS transmission satisfy uniform power boosting across the CSI-RS ports containing the CSI-RS transmission, and wherein a group of four CSI-RS ports of the CSI-RS ports configured for the wireless device are mapped to a group of four CSI-RS REs and CSI-RS for the group of four CSI-RS ports are multiplexed onto the group of four CSI-RS REs using respective length-4 Orthogonal Cover Codes (OCCs), and
wherein the CSI-RS ports containing the CSI-RS transmission satisfy a Signal to Interference plus Noise Ratio (SINR) improvement of at least 3 decibels for each of the CSI-RS ports containing the CSI-RS transmission over a case where two CSI-RS ports are multiplexed onto two CSI-RS REs using length-2 OCCs.

17. The wireless device of claim 16, wherein by execution of the software instructions, the wireless device is further operable to:
- perform measurements on the plurality of CSI-RS ports configured for the wireless device; and
- transmit a Channel State Information (CSI) report to the radio access node based on the measurements.

18. The wireless device of claim 16, wherein the group of four CSI-RS REs are in two Orthogonal Frequency Division Multiplexing (OFDM) symbols on two subcarriers.

19. The wireless device of claim 16, wherein receiving configuration of the CSI-RS ports comprises receiving a bit map that is an indication of which of a plurality of pre-defined CSI-RS resources contain CSI-RS.

* * * * *

UNITED STATES PATENT AND TRADEMARK OFFICE
CERTIFICATE OF CORRECTION

PATENT NO. : 11,750,445 B2
APPLICATION NO. : 17/404813
DATED : September 5, 2023
INVENTOR(S) : Frenne et al.

It is certified that error appears in the above-identified patent and that said Letters Patent is hereby corrected as shown below:

On the Title Page

On Page 2, in Item (56), under "OTHER PUBLICATIONS", in Column 2, Line 9, delete "Drganizational" and insert -- Organizational --, therefor.

On Page 2, in Item (56), under "OTHER PUBLICATIONS", in Column 2, Line 12, delete "ccess" and insert -- Access --, therefor.

In the Specification

In Column 2, Line 65, delete "$\alpha_{k,l}^{(p)}$" and insert -- $a_{k,l}^{(p)}$ --, therefor.

In Column 3, Line 23, delete "$n_s$ mod (2)=0)" and insert -- $n_s$mod (2)=0) --, therefor.

In Column 3, Line 24, delete "$n_s$ mod (2)=1)." and insert -- $n_s$mod (2)=1). --, therefor.

In Column 3, Line 25, delete "$w_{l'}$" and insert -- $w_{l''}$ --, therefor.

In Column 15, Line 58, delete "(dB) (=10 log 10(4))" and insert -- (dB) (=10log10(4)) --, therefor.

In Column 20, Line 59, delete "16-port port" and insert -- 16-port --, therefor.

In Column 30, Line 19, delete "index '1'" and insert -- index 'l' --, therefor.

Signed and Sealed this
Twenty-seventh Day of February, 2024

Katherine Kelly Vidal
*Director of the United States Patent and Trademark Office*